US012279592B2

(12) United States Patent
Blampied

(10) Patent No.: US 12,279,592 B2
(45) Date of Patent: *Apr. 22, 2025

(54) ANIMAL HANDLING DEVICE

(71) Applicant: Te Pari Products Limited, Oamaru (NZ)

(72) Inventor: Nicholas Mark Blampied, Oamaru (NZ)

(73) Assignee: TE PARI PRODUCTS LIMITED, Oamaru (NZ)

( * ) Notice: Subject to any disclaimer, the term of this patent is extended or adjusted under 35 U.S.C. 154(b) by 55 days.

This patent is subject to a terminal disclaimer.

(21) Appl. No.: 17/856,442

(22) Filed: Jul. 1, 2022

(65) Prior Publication Data

US 2022/0346346 A1 Nov. 3, 2022

Related U.S. Application Data

(63) Continuation of application No. 17/078,870, filed on Oct. 23, 2020, now Pat. No. 11,412,705.

(30) Foreign Application Priority Data

Oct. 24, 2019 (NZ) ........................................ 758535

(51) Int. Cl.
| | |
|---|---|
| *A01K 1/06* | (2006.01) |
| *A01K 1/062* | (2006.01) |
| *A01K 11/00* | (2006.01) |
| *A01K 15/04* | (2006.01) |
| *A61D 3/00* | (2006.01) |

(52) U.S. Cl.
CPC ............ *A01K 1/0613* (2013.01); *A01K 1/062* (2013.01); *A01K 11/006* (2013.01); *A01K 15/04* (2013.01); *A61D 3/00* (2013.01)

(58) Field of Classification Search
CPC .................................................... A01K 1/0613
See application file for complete search history.

(56) References Cited

U.S. PATENT DOCUMENTS

| | | | |
|---|---|---|---|
| 3,799,117 A | 3/1974 | Tribbey | |
| 4,286,679 A | 9/1981 | Schneider | |
| 4,632,063 A * | 12/1986 | Priefert | .................... A61D 3/00 119/730 |
| 4,942,846 A | 7/1990 | Reinhold et al. | |
| 5,576,949 A | 11/1996 | Scofield et al. | |
| 5,673,647 A | 10/1997 | Pratt | |
| 5,801,339 A | 9/1998 | Boult | |

(Continued)

FOREIGN PATENT DOCUMENTS

| | | |
|---|---|---|
| AU | 2003204677 B2 | 5/2009 |
| EP | 2656730 | 10/2013 |

(Continued)

*Primary Examiner* — Monica L Perry
*Assistant Examiner* — Brittany A Lowery
(74) *Attorney, Agent, or Firm* — Holzer Patel Drennan

(57) ABSTRACT

Described herein is an animal handling device in the form of a cattle crush with automated headbail capture, back bar operation and positional sensing along with methods of use thereof. The crush and method offer automation for functions that in the art have been largely manual and inherently labour intensive, physical and even potentially dangerous for the operator and/or animal.

12 Claims, 17 Drawing Sheets

(56) References Cited

U.S. PATENT DOCUMENTS

| | | | |
|---|---|---|---|
| 6,213,058 B1* | 4/2001 | Byl | A01K 1/0023 |
| | | | 119/843 |
| 6,239,711 B1 | 5/2001 | Downey et al. | |
| 6,425,351 B1 | 7/2002 | Mollhagen | |
| 6,552,278 B2 | 4/2003 | Johnson | |
| 6,805,078 B2 | 10/2004 | Zimmerman et al. | |
| 6,838,625 B2 | 1/2005 | Ostermann | |
| 6,868,804 B1* | 3/2005 | Huisma | A01K 29/00 |
| | | | 119/842 |
| 7,129,423 B2 | 10/2006 | Baarsch et al. | |
| 7,770,542 B2* | 8/2010 | Mollhagen | A01K 1/0613 |
| | | | 119/734 |
| 8,869,749 B2 | 10/2014 | Keong | |
| 10,085,419 B2 | 10/2018 | Zimmerman et al. | |
| 10,184,824 B1 | 1/2019 | Eakin | |
| 10,779,506 B1* | 9/2020 | Ulrich | A01K 1/0613 |
| 2002/0158765 A1 | 10/2002 | Pape et al. | |
| 2004/0035370 A1 | 2/2004 | Fagan | |
| 2004/0212493 A1 | 10/2004 | Stilp | |
| 2005/0132978 A1 | 6/2005 | Bentz | |
| 2006/0254532 A1* | 11/2006 | Boriack | A01K 1/0613 |
| | | | 119/730 |
| 2007/0056529 A1 | 3/2007 | Baarsch et al. | |
| 2007/0288249 A1* | 12/2007 | Rowe | A01K 11/008 |
| | | | 705/7.11 |
| 2009/0266309 A1* | 10/2009 | Hunter | A01K 1/0613 |
| | | | 119/751 |
| 2010/0056899 A1 | 3/2010 | Toddes et al. | |
| 2010/0246970 A1 | 9/2010 | Springer et al. | |
| 2011/0023795 A1* | 2/2011 | Huls | A01K 1/0023 |
| | | | 119/843 |
| 2012/0272917 A1* | 11/2012 | Hofman | A01J 9/00 |
| | | | 119/14.08 |
| 2013/0192538 A1 | 8/2013 | Ulrich | |
| 2016/0125276 A1 | 5/2016 | Spicola, Sr. et al. | |
| 2017/0013802 A1 | 1/2017 | Zimmerman et al. | |
| 2017/0124264 A1 | 5/2017 | Jordan et al. | |
| 2017/0189155 A1* | 7/2017 | Crosby | A01K 1/0023 |
| 2017/0223925 A1 | 8/2017 | Neal | |
| 2018/0042200 A1 | 2/2018 | Gipson | |
| 2018/0116171 A1 | 5/2018 | Beavers | |
| 2019/0297840 A1* | 10/2019 | Coulter | A61D 3/00 |

FOREIGN PATENT DOCUMENTS

| | | |
|---|---|---|
| EP | 2921133 A1 | 9/2015 |
| JP | H09126873 A | 5/1997 |
| JP | 4911356 B2 | 1/2012 |
| NZ | 519622 | 10/2004 |
| NZ | 537027 A | 2/2008 |
| NZ | 627232 A | 9/2014 |

* cited by examiner

ANIMAL HANDLING DEVICE

RELATED APPLICATIONS

This application is a continuation of U.S. patent application Ser. No. 16/078,870, filed on Oct. 23, 2020. The entirety of which is incorporated herein by reference.

This application derives priority from New Zealand patent application number 758535 incorporated herein by reference available via WIPO DAS code B2EA.

TECHNICAL FIELD

Described herein is an animal handling device. More specifically, a cattle crush is described with automated headbail capture, back bar operation and positional sensing along with methods of use thereof.

BACKGROUND ART

An animal handling device or a crush as it is otherwise often termed generally comprises a pen with walls, an entrance and an exit through which an animal passes. The crush may comprise a constricting apparatus, typically with a wall or walls that restrain sideways movement of the animal. The entrance and exit of the crush may comprise barriers to allow entry into, containment and exit from the crush space. The crush exit may comprise a headbail comprising two opposing barriers that move from an open position with a gap between the barriers to a closed position where the gap is narrowed. In use, as an animal moves their head through the open barriers, the barriers are then manually moved together, the barrier edges meeting the animal's neck from either side and restraining the animal from moving forwards or backwards.

A crush may be used for treating cattle arriving at a feedlot and which are to undergo induction. The induction process may involve herding the cattle through holding pens and laneways into a crush where the animals may be ear-tagged, assessed, treated, weighed, recorded and/or drafted. The process is labour intensive, physical and, at times, dangerous for both the operator and animal.

Handling of animals in a crush can be difficult. Animals can become confused and agitated, stop, move backwards, bunch, and/or climb over each other along the lanes leading to the crush. Once in the crush animals may be caught in the headbail with heads and necks under the head bail resulting in delays as the animal is released, the head raised and then secured correctly in the headbail. Animals may not be adequately restrained and animal legs may slip on the floor/ground or animals may move around causing issues for the operator, e.g. in trying to perform one of the above steps in relation to the animal, such as administering a medicament such as an injection.

Reference is made to a cattle crush hereafter, this being an animal handling device specifically designed to restrain cattle therein. The term 'crush' is used in the context of the pen imposing a sideways crush force on the animal of sufficient strength to restrain animal movement, typically as noted above using one or more walls that move together against the animal side to restrain the animal. Reference to cattle may be important in terms of the device design, function and operation but could be altered to suit other animals and reference to cattle should not be seen as limiting.

Critical to the design of the unit is the ease of use and ability of the unit to restrain the animal and to do so in a humane manner. This typically means use of robust materials, simple but functional design and low noise of operation. For large herds, the speed of operation and ability to automate processing also may be important. Automating handling may, for example, reduce the number of people needed to operate a cattle crush and hence reduce labour costs. Automation may also increase cattle crush reliability for large herds and sustained use.

A crush may also include a so-called back bar to prevent rearward movement of the animal contained within the crush. A back bar may be an elongated member placed across the rear of the animal and which engages holding clips on the crush walls. Art back bars are manually operated.

Further aspects and advantages of the animal handling device will become apparent from the ensuing description that is given by way of example only.

SUMMARY

Described herein is an animal handling device in the form of a cattle crush with automated headbail capture, back bar operation and positional sensing along with methods of use thereof. The crush and method offer automation for functions that in the art have been largely manual and inherently labour intensive, physical and even potentially dangerous for the operator and/or animal.

In a first aspect, there is provided an animal crush comprising:
an enclosure defined by opposing side walls, an animal crush entry and, distant to the animal crush entry, a headbail comprising a pair of opposing barriers;
wherein the headbail barriers are configured to move between:
  a fully open position where the barriers are open to an extent that the barriers do not block movement of an animal through the barriers;
  a closed position that imposes sufficient force on the animal's neck positioned between the barriers to capture the animal and prevent animal movement forwards or backwards; and
  a variable position, the barriers separated by a variable distance, the variable distance being a separation distance intermediate the open and closed positions;
wherein the distance between the barriers in the variable position is determined by a controller, the controller receiving data on animal characteristics and, in response to the animal characteristic data, setting the variable position barrier separation distance via at least one actuator; and
when an animal is sensed proximate the headbail barriers, the controller causes actuation of the barriers to close from the variable position to the closed position to capture the animal within the headbail barriers.

In a second aspect, there is provided a method of restraining an animal via the animal crush substantially as described above, wherein, in use:
animal characteristics data is provided to the controller and the controller sets the headbail barriers to the variable position;
an animal is herded into a holding pen and along a race, the race directing an animal into the animal crush;
the animal enters the animal crush and, when proximate the barriers, the controller causes actuation of the barriers to close from the variable position to the closed position to capture the animal within the headbail barriers.

In a third aspect, there is provided an animal crush comprising:
- an enclosure defined by opposing side walls, a crush entry and, distant to the crush entry, a headbail comprising a pair of opposing barriers;
- wherein the headbail barriers are configured to move between an open position that allows an animal to at least partly move through the barriers and a closed position that imposes sufficient force on the animal's neck positioned between the barriers to capture the animal and prevent animal movement forwards or backwards; and
- at least one backbar, the backbar or backbars configured to automatically move in response to a signal from an animal position sensor from a retracted position to an animal urging position behind an animal to urge the animal forwards through the animal crush towards the headbail barriers.

In a fourth aspect, there is provided a method of restraining an animal via the animal crush substantially as described above wherein, in use:
- an animal is herded into a holding pen and along a race, the race directing an animal into the animal crush;
- as the animal enters the animal crush the animal sensor senses animal movement and actuates movement of the backbar from the retracted position to the animal urging position.

In a fifth aspect, there is provided an animal crush comprising:
- an enclosure defined by opposing side walls, a crush entry and, distant to the crush entry, a headbail comprising a pair of opposing barriers;
- wherein the headbail barriers are configured to move between an open position that allows an animal to at least partly move through the barriers and a closed position that imposes sufficient force on the animal's neck positioned between the barriers to capture the animal and prevent animal movement forwards or backwards; and
- multiple load cells located in varying positions about an animal crush base, the load cells configured to sense animal weight thereon and providing measured weight and load cell location to a controller, the controller then calculating the animal position on the animal crush base based on combined measured weights and the load cell positions;
- the measured animal position is used to identify when an animal on the animal crush is proximate the headbail barriers and, at this measured point, actuating the headbail barriers to move to a closed position from a variable position to capture the animal between the barriers.

In a sixth aspect, there is provided a method of restraining an animal via the animal crush substantially as described above wherein, in use:
- an animal is herded into a holding pen and along a race, the race directing an animal into the animal crush;
- as the animal enters the animal crush, the load cells sense a change in load on the animal crush base and provide measured weight and load cell location to a controller, the controller then calculating the animal position on the animal crush base based on the combined measured weights and the load cell positions;
- the measured animal position used to identify when an animal on the animal crush is proximate the headbail barriers and, at this measured point, actuating the headbail barriers to move to a closed position from a variable position to capture the animal between the barriers.

In a seventh aspect, there is provided an animal crush comprising:
- an enclosure defined by opposing side walls, an animal crush entry and, distant to the animal crush entry, a headbail comprising a pair of opposing barriers;
- wherein the headbail barriers are configured to move between:
  - an open position where the barriers are open to an extent that the barriers do not block movement of an animal through the barriers;
  - a closed position that imposes sufficient force on the animal's neck positioned between the barriers to capture the animal and prevent animal movement forwards or backwards; and
  - a variable position, the barriers separated by a variable distance, the variable distance being a separation distance intermediate the open and closed positions;
- wherein the distance between the barriers in the variable position is determined by a controller, the controller receiving data on animal characteristics and, in response to the animal characteristics data, setting the variable position distance between the barriers via at least one actuator; and
- wherein the animal crush further comprises at least one backbar that is configured to automatically move in response to a signal from an animal position sensor from a retracted position to an animal urging position behind an animal to urge the animal forwards through the animal crush towards the headbail barriers; and
- wherein the animal position sensor comprises multiple load cells located in varying positions about an animal crush base, the load cells configured to sense animal weight thereon and providing measured weights and load cell locations to a controller, the controller then calculating the animal position on the animal crush base based on the combined measured weights and load cell positions; and
- wherein the measured animal position is used to identify when an animal on the animal crush is proximate the headbail barriers and, at this measured point, actuating the headbail barriers to move to the closed position from the variable position to capture the animal between the barriers.

In an eighth aspect, there is provided a method of restraining an animal via the animal crush substantially as described above wherein, in use:
- animal size data is provided to the controller and the controller sets the headbail barriers to the variable position distance between the barriers;
- an animal is herded into a holding pen and along a race, the race directing an animal into the animal crush;
- as the animal enters the animal crush, the load cells sense a change in load on the animal crush base and provide measured weights and load cell locations to a controller, the controller then calculating the animal position on the animal crush base based on the combined measured weights and load cell positions;
- the measured animal position used to:
  - actuate the backbar from a retracted position to an animal urging position behind an animal to urge the animal forwards through the animal crush and towards the headbail barriers; and
  - identify when an animal on the animal crush is proximate the headbail barriers and, at this measured point, actuating the headbail barriers to a closed position from the variable position to capture the animal between the barriers.

As may be realised from the above summary, the animal handling devices and methods described herein provide automation to otherwise manual operations and may therefore aid in animal handling operations potentially speeding operation, reduce labour and physical requirements for the handling process and increasing safety for both the operator and animal.

BRIEF DESCRIPTION OF THE DRAWINGS

Further aspects of the animal handling device will become apparent from the following description that is given by way of example only and with reference to the accompanying drawings in which.

DETAILED DESCRIPTION

Figure 1:
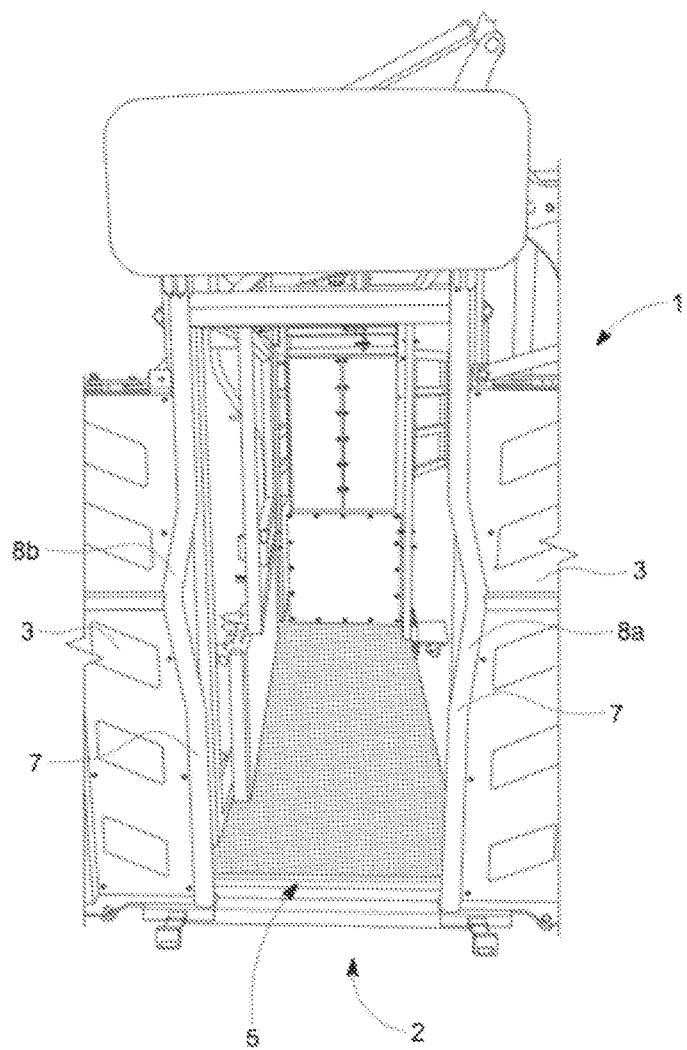
FIG. 1 illustrates a perspective view of an art animal crush shown from the headbail end of the animal crush art with headbail barriers in a fully open position.

As noted above, described herein is an animal handling device in the form of a cattle crush with automated headbail capture, back bar operation and positional sensing along with methods of use thereof. The crush and method offer automation for functions that in the art have been largely manual and inherently labour intensive, physical and even potentially dangerous for the operator and/or animal.

For ease of description, the term 'cattle crush' or 'crush' is used to interchangeably herein to refer to the animal handling device. Reference to a cattle crush should not be seen as limiting since the device with minor changes in for example size, could be used for other applications e.g. to restrain movement of sheep, deer or other livestock.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%.

The term 'comprise' and grammatical variations thereof shall have an inclusive meaning—i.e. that it will be taken to mean an inclusion of not only the listed components it directly references, but also other non-specified components or elements.

Automated Barriers

In a first aspect, there is provided an animal crush comprising:
an enclosure defined by opposing side walls, an animal crush entry and, distant to the animal crush entry, a headbail comprising a pair of opposing barriers;
wherein the headbail barriers are configured to move between:
a fully open position where the barriers are open to an extent that the barriers do not block movement of an animal through the barriers;

a closed position that imposes sufficient force on the animal's neck positioned between the barriers to capture the animal and prevent animal movement forwards or backwards; and a variable position, the barriers separated by a variable distance, the variable distance being a separation distance intermediate the open and closed positions;

wherein the distance between the barriers in the variable position is determined by a controller, the controller receiving data on animal characteristics and, in response to the animal characteristic data, setting the variable position barrier separation distance via at least one actuator; and when an animal is sensed proximate the headbail barriers, the controller causes actuation of the barriers to close from the variable position to the closed position to capture the animal within the headbail barriers.

In a second aspect, there is provided a method of restraining an animal via the animal crush substantially as described above, wherein, in use:

animal characteristics data is provided to the controller and the controller sets the headbail barriers to the variable position;

an animal is herded into a holding pen and along a race, the race directing an animal into the animal crush;

the animal enters the animal crush and, when proximate the barriers, the controller causes actuation of the barriers to close from the variable position to the closed position to capture the animal within the headbail barriers.

Barrier Closed and Open Position

The closed position is a point at which the barriers have a reduced distance of separation and is a position that holds/restrains the animal. This may be the closest point that the barriers may move to or a separation distance slightly wider than this closest position. The exact closed position may be somewhat variable depending on the animal neck size. The act of the barriers moving from a variable position to a closed position is referred herein to catching or capture. Once captured, the animal is held or restrained in place until the barriers are opened.

The fully open position may typically be a position where the barriers are withdrawn in part or in full so as to allow an animal unrestricted movement past the barriers. In this embodiment, the barriers retreat back towards or even beyond the walls of the animal crush so that they do not impede animal movement. Typically, when the barriers open, the animal will tend to move forwards from the animal crush away from the animal crush entry. In an alternative embodiment, when the barriers open, the animal may move backwards to exit the animal crush via the entry to the animal crush. In this embodiment, beyond the barriers may be a wall or gate that impedes animal movement forwards.

Variable Position Spacing and Animal Size

As noted above, the variable position is a position where the barriers are partly open but not fully open so as to allow unimpeded movement through the headbail by an animal. The barrier separation distance is also not so narrow as to abut or bear on an animal. In one embodiment, the variable position refers to a barrier separation distance corresponding at least substantially to the width of an animal head and at least part of the animal neck—that is, when in the variable position, an animal entering the animal crush can see the exit beyond the barriers and the animal head and at least part of the animal neck can fit through the barriers when in the variable position. In the variable position, the barrier separation distance may be less than the width of the animal shoulders. In the variable position, the barrier separation distance may be equal to or greater than the width of an animal head and equal to or less than the width of the animal shoulders.

As may be appreciated the exact distance of separation of the barriers when in the variable position may vary. Using cattle as one example, cattle vary in head, neck and shoulder width based on age e.g. calves are narrower generally than adult cattle. Cattle may vary in size by sex e.g. males tend to be larger than females. Degree of nourishment may also vary animal size. An aim of the automated animal crush described may be to allow for variations in animal or animal mob size and hence pre-set the barriers to an optimum variable position that is best ready to engage and capture an animal as it passes through the barriers. If the opening is too large, incorrect capture may occur with barrier closing lagging animal speed and hence not capturing the animal about the animal neck. Similarly, if the opening is too small, the animal will not see an escape route and hence not want to move forwards and hence not be caught by the barriers. A further complication in animal capture may be the fact that the animal may be moving as they are captured, sometimes with considerable speed and/or force hence speed and accuracy of timing of capture is critical hence the value of a variable position at an optimum position.

Typically in the art, the crush user will either not use a variable position at all moving the barriers manually from a fully open to a closed position e.g. via a lever. Alternatively, a crush user may partly close the barriers via the manual lever and attempt to catch the animal by manually moving the lever to close the barriers at the right time. If a part closed barrier is used, this distance is usually based on a mob size as it is too hard to constantly check and vary the separation distance in manual operations.

Automation of the barriers may control movement to a closed position when an animal is detected and may return the barriers to the same part open position once the animal is released. Automated barrier variable position greatly improves the rate of success of catching the animal and removes significant labour requirements plus increases safety for both the animal and user by limiting the degree of interaction between people and animals and moving parts and the user.

Individual Animal or Mob

The animal size data used by the controller to set the variable position of the barriers for a particular animal may include information about the individual particular animal. The barrier separation distance in the variable position may vary between each animal based on measured individual animal characteristics selected from: animal shape; animal size; animal age; animal species; animal weight; animal sex; animal body condition score (BCS); animal ID tag; and combinations thereof. In this embodiment, the barrier variable position is re-calculated for each animal that passes through the animal crush.

In an alternative embodiment, the animal size data used by the controller to set the variable position of the barriers may include information about a mob of animals. For the purposes of this specification, a 'mob' refers to two or more animals or a group of two or more animals, animals in the mob passing one by one through the animal crush. The barrier separation distance in the variable position may vary between each mob of animals based on measured mob animal characteristics selected from: animal shape; animal size; animal age; animal species; animal weight; animal sex; animal body condition score (BCS); animal ID tag; and combinations thereof.

The information about the individual animal or mob of animals noted above may be used to datum the barrier open and/or closed positions within a range of positions possible to provide an animal optimised open position and/or closed position.

Distance Sensing

The distance between the barriers in the open and/or closed and/or variable positions may be sensed via a potentiometer and the controller that receives the sensed data may adjust the open position, and/or variable position, and/or closed position to a pre-programmed potentiometer reading corresponding to the required barrier position.

Animal Detection

The one or more sensors may also sense the presence of an animal and the controller may automatically cause actuation and barrier movement from a variable position to a closed position in response to sensing of the presence of an animal.

Head Position Adjustment

The headbail may comprise an automatic head position adjustor to alter the head opening position between the barriers. Adjustment in position may for example by up or down relative to the animal crush base. Adjustment up and down may be helpful to adjust the barriers to catch animals of varying size and height and/or to catch animals where the head position is not neutral i.e. head up or head down alignment relative to a neutral neck and head position.

Yoke

Each of the pair of barriers may include a yoke region (bent or bulge region) intermediate the top and bottom of the barrier, the yoke regions aligning in the closed position to form an opening between the barriers with a shape and form that complements the shape of the neck region of an animal to be restrained within the headbail. The presence of a yoke region is not always required and some art non-automated head bail devices have no yoke region and instead have straight sided barriers.

Backbar

In a third aspect, there is provided an animal crush comprising:
- an enclosure defined by opposing side walls, a crush entry and, distant to the crush entry, a headbail comprising a pair of opposing barriers;
- wherein the headbail barriers are configured to move between an open position that allows an animal to at least partly move through the barriers and a closed position that imposes sufficient force on the animal's neck positioned between the barriers to capture the animal and prevent animal movement forwards or backwards; and
- at least one backbar, the backbar or backbars configured to automatically move in response to a signal from an animal position sensor from a retracted position to an animal urging position behind an animal to urge the animal forwards through the animal crush towards the headbail barriers.

In a fourth aspect, there is provided a method of restraining an animal via the animal crush substantially as described above wherein, in use:
- an animal is herded into a holding pen and along a race, the race directing an animal into the animal crush;
- as the animal enters the animal crush the animal sensor senses animal movement and actuates movement of the backbar from the retracted position to the animal urging position.

While a back bar such as a manually moved pipe is known, automating back bar movement, particularly with respect to a head bail apparatus, is not used in the inventor's experience. Automation of crush aspects may be an advantage to allow an operator to not approach the animal or crush. Automation of the back bar may also encourage more controlled animal movement and hence better coordination between the head bail capture and back bar movement causing animal movement.

Backbar Movement

The at least one backbar in the retracted position may be located on a or the side wall or walls of the animal crush. The at least one backbar may pivot from the side wall or walls of the animal crush.

In a retracted position, the at least one backbar may not interfere with movement of an animal past the retracted at least one backbar.

The at least one backbar may be configured to move along the animal crush longitudinal axis while the at least one backbar is in an animal urging position and/or while the at least one backbar moves to the animal urging position.

Movement of the at least one backbar along the animal crush longitudinal axis may for example be provided by a carriage or rail mechanism.

Backbar Actuation

The animal crush may include one or more sensors, the one or more sensors activating the at least one backbar to move from the retracted position to the animal urging position. In this embodiment, the one or more sensors may be mounted above the crush and may detect animal movement below the one or more sensors.

The one or more sensors may be mounted above the animal crush. A controller may receive the sensed signal and activate backbar movement as the animal passes at least one of the one or more sensors.

Two Backbars

In one embodiment, the animal crush may comprise two backbars, each backbar mounted about the walls of the animal crush and configured to move in synchronisation together to urge the animal forwards.

Positional Sensing

In a fifth aspect, there is provided an animal crush comprising:
- an enclosure defined by opposing side walls, a crush entry and, distant to the crush entry, a headbail comprising a pair of opposing barriers;
- wherein the headbail barriers are configured to move between an open position that allows an animal to at least partly move through the barriers and a closed position that imposes sufficient force on the animal's neck positioned between the barriers to capture the animal and prevent animal movement forwards or backwards; and
- multiple load cells located in varying positions about an animal crush base, the load cells configured to sense animal weight thereon and providing measured weight and load cell location to a controller, the controller then calculating the animal position on the animal crush base based on combined measured weights and the load cell positions;
- the measured animal position is used to identify when an animal on the animal crush is proximate the headbail barriers and, at this measured point, actuating the headbail barriers to move to a closed position from a variable position to capture the animal between the barriers.

In a sixth aspect, there is provided a method of restraining an animal via the animal crush substantially as described above wherein, in use:

an animal is herded into a holding pen and along a race, the race directing an animal into the animal crush;

as the animal enters the animal crush, the load cells sense a change in load on the animal crush base and provide measured weight and load cell location to a controller, the controller then calculating the animal position on the animal crush base based on the combined measured weights and the load cell positions;

the measured animal position used to identify when an animal on the animal crush is proximate the headbail barriers and, at this measured point, actuating the headbail barriers to move to a closed position from a variable position to capture the animal between the barriers.

In one embodiment for the above aspects, the controller may receive data on the individual animal or mob of animal characteristics to provide a datum around anticipated animal weight on the crush base.

Animal Position Sensing Generally

As noted above, as the animal attempts to exit the animal crush, one or more sensors may automatically sense the presence of the animal and a controller may actuate a headbail/headbail barriers thereby halting motion of the animal.

The animal crush may also comprise a moving side wall or walls that are activated to bear on the animal side(s) to further restrain the animal in the animal crush. Sidewall movement may also occur in response to sensed measures of animal position.

In an alternative embodiment, as the animal attempts to exit the crush, a crush assembly may activate to squeeze the animal sideways in the crush and a controller may then actuate a headbail/barriers to fully restrain the animal.

Sensing may be through simple solutions such as optical sensors that 'see' the animal at a particular position however, positional sensing such as that described in the above aspects has certain advantages.

Positional Sensing

As noted above, the animal crush base may include load cells.

The load cells may be located at different points about the crush base and have a unique location attributable to that point on the animal crush base.

The load measured on an individual load cell may vary to the load measured on other load cells depending on the position of an animal on the animal crush base.

Post capture, the animal may be manually released from the crush, animal release resulting in the barriers moving to an open position.

The total weight measured may also vary across the load cells depending on whether the animal is partly on or fully on the animal crush base. By providing a controller with information about load cell location and measured load, the controller may determine whether an animal is partly or fully on the crush base and whereabouts the animal is on the base.

For example, if only the front legs of the animal are on the crush base, the measured load will be lower than an anticipated full weight and the load will be concentrated on a load cell or cells located about for example, the crush entry or crush exit. Once the animal is fully on the crush base but nearer the crush entry, load cells proximate the crush entry and mid-point of the crush base will register a greater loading than load cells located about the head bail barriers. Finally, as the animal moves to the barriers, a load cell or cells about the barriers may register a greater load and hence signal animal position about the barriers. Measured position on the crush base may be used as signal inputs to the controller to actuate certain functions such as barrier closing and capture of the animal therein and/or backbar actuation described in earlier aspects.

Positional sensing using load cells (or load cells with other types of sensing) may have a number of advantages over art optical only position sensing.

Art animal crush systems may for example use multiple optical sensors (four or more) to detect animal position about the crush base. Optical sensors are not ideal in this application since they are relatively costlier than load cells; they are fragile and the sensors can easily be damaged livestock and/or the sensor wiring can be damaged by livestock. The environment these sensors operate in is also potentially challenging with dust, water, UV light and other issues inherent to an outdoor environment to address. Optical sensors also need to be physically adjusted based on livestock size to weigh reliably.

Positional weighing by contrast costs less, uses sensors already present on an animal crush since the approach is an adaption of signals measured from already present weight measuring sensors; fewer sensors may be needed or at least fewer optical sensors needed hence greater reliability and less potential for damage to the sensors and wiring; wiring for load cells is typically housed within the crush walls or framework hence is more robust than optical sensor wiring that is often exposed; position measurement and actions taken from those measurements can be more accurate and hence provide greater overall reliability and fewer stoppages. A further advantage of positional sensing using load cells may be that the sensed signals provide a more granular picture of position whereas optical sensors are a binary off/on type sensor. A more granular view of animal position allows actuation for example of barriers in advance of animal movement to an optimum capture position therefore reducing the chance of signal lag and missing capture of the moving animal.

Post Capture and Restraint

In the above methods, once restrained, various measurements and treatment steps may be completed. Selected examples of steps that may be taken include: measuring animal weight, determining EID, temperature, BCS; pour on gun actuation to dispense a dose to the animal, electronic injector gun actuation to dispense one or more medicaments, and combinations thereof.

Animal Release

In one embodiment, post capture, the animal may be manually released from the crush. Manual release may be by the user pressing a release button on a controller or actuating a lever.

Release may result in the barriers moving to an open position.

In an alternative embodiment, post capture, the animal may be automatically released from the crush. Automatic animal release may be after a pre-determined period of time and/or after certain operations having occurred e.g. after automated or manual identification tag reading and weight measurement. On automatic release, the barriers may move to an open position.

As noted above, the barriers may define an animal crush exit that the animals moves through. In this embodiment, the animal crush is like a corridor that the animal moves through. At least one or more gates may be located beyond the barriers of the head bail still integral to the animal crush. The head bail barriers need not be the final exit restriction from the animal crush.

In an alternative embodiment, the animal crush entry may also be the animal crush exit and when the barriers open, the animal reverses out of the animal crush via the animal crush entry. In this embodiment, the animal enters forwards and exits by walking backwards from the animal crush.

Multi-Function Animal Crush

In a seventh aspect, there is provided an animal crush comprising:
- an enclosure defined by opposing side walls, an animal crush entry and, distant to the animal crush entry, a headbail comprising a pair of opposing barriers;
- wherein the headbail barriers are configured to move between:
  - an open position where the barriers are open to an extent that the barriers do not block movement of an animal through the barriers;
  - a closed position that imposes sufficient force on the animal's neck positioned between the barriers to capture the animal and prevent animal movement forwards or backwards; and
  - a variable position, the barriers separated by a variable distance, the variable distance being a separation distance intermediate the open and closed positions;
- wherein the distance between the barriers in the variable position is determined by a controller, the controller receiving data on animal characteristics and, in response to the animal characteristics data, setting the variable position distance between the barriers via at least one actuator; and
- wherein the animal crush further comprises at least one backbar that is configured to automatically move in response to a signal from an animal position sensor from a retracted position to an animal urging position behind an animal to urge the animal forwards through the animal crush towards the headbail barriers; and
- wherein the animal position sensor comprises multiple load cells located in varying positions about an animal crush base, the load cells configured to sense animal weight thereon and providing measured weights and load cell locations to a controller, the controller then calculating the animal position on the animal crush base based on the combined measured weights and load cell positions; and
- wherein the measured animal position is used to identify when an animal on the animal crush is proximate the headbail barriers and, at this measured point, actuating the headbail barriers to move to the closed position from the variable position to capture the animal between the barriers.

In an eighth aspect, there is provided a method of restraining an animal via the animal crush substantially as described above wherein, in use:
- animal size data is provided to the controller and the controller sets the headbail barriers to the variable position distance between the barriers;
- an animal is herded into a holding pen and along a race, the race directing an animal into the animal crush;
- as the animal enters the animal crush, the load cells sense a change in load on the animal crush base and provide measured weights and load cell locations to a controller, the controller then calculating the animal position on the animal crush base based on the combined measured weights and load cell positions;
- the measured animal position used to:
  - actuate the backbar from a retracted position to an animal urging position behind an animal to urge the animal forwards through the animal crush and towards the headbail barriers; and
  - identify when an animal on the animal crush is proximate the headbail barriers and, at this measured point, actuating the headbail barriers to a closed position from the variable position to capture the animal between the barriers.

As may be appreciated, the above aspects described fully integrated barriers, backbar operation and positional sensing. These three features need not be used together and hence these aspects should not be seen as limiting.

In one embodiment, the animal crush described in the above aspects may comprise at least one further sensor to detect position of an animal on the animal crush, the at least one further sensor comprising:
- at least one sensor detecting animal movement about the headbail barriers; and/or
- at least one sensor directed about the animal crush enclosure detecting animal movement proximate at least one backbar.

Advantages

As may be realised from the above description, the animal handling devices and methods described herein provide automation to otherwise manual operations and may therefore aid in animal handling operations potentially speeding operation, reduce labour and physical requirements for the handling process and increasing safety for both the operator and animal.

The embodiments described above may also be said broadly to consist in the parts, elements and features referred to or indicated in the specification of the application, individually or collectively, and any or all combinations of any two or more said parts, elements or features.

Further, where specific integers are mentioned herein which have known equivalents in the art to which the embodiments relate, such known equivalents are deemed to be incorporated herein as if individually set forth.

WORKING EXAMPLES

The above described animal handling device is now described by reference to specific examples.

Example 1

In this example an automatic headbail barrier is described.

Figure 2:
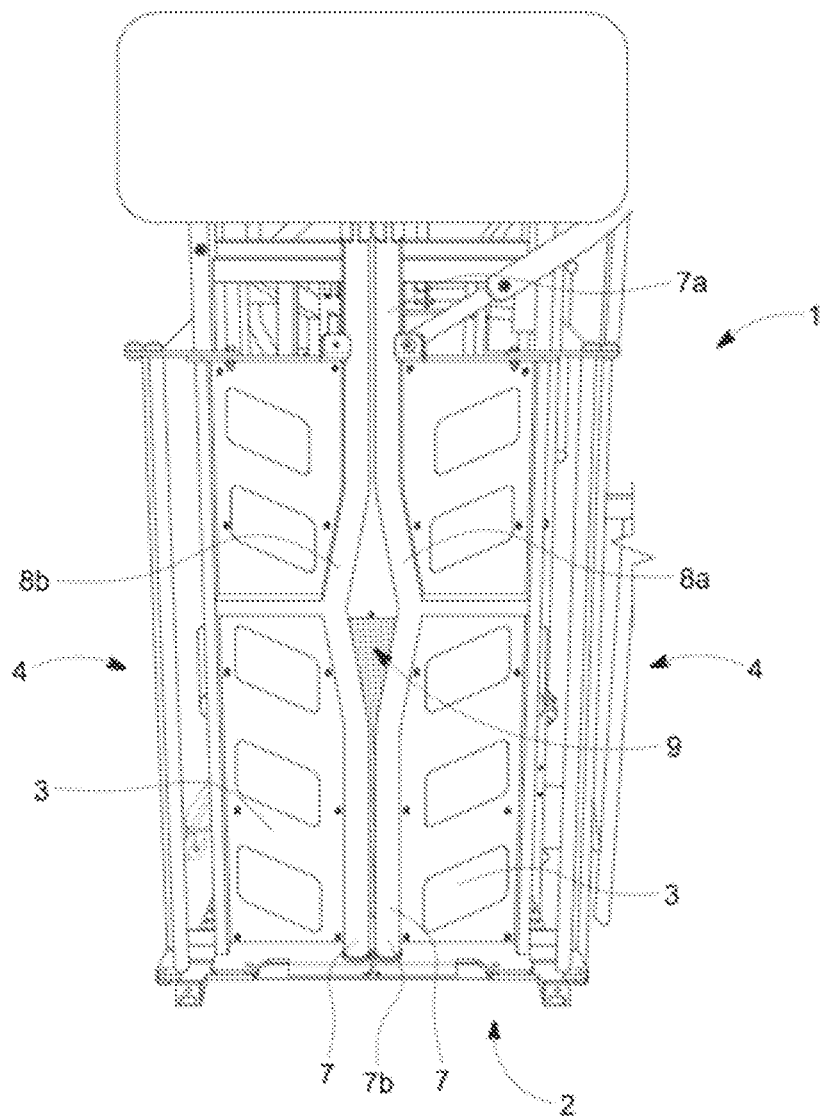
FIG. 2 illustrates a perspective view of an art animal crush shown from the headbail end of the animal crush art with headbail barriers in a fully closed position.
Figure 3:
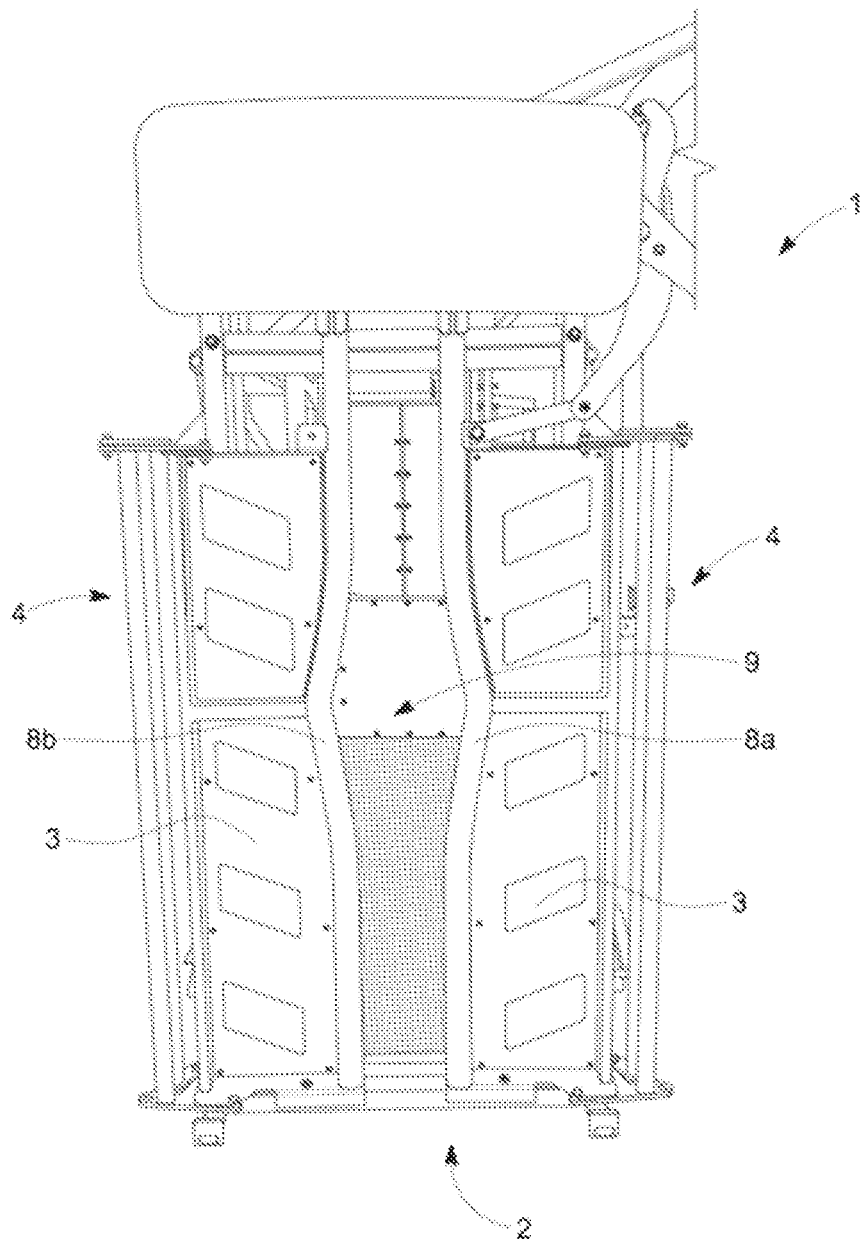
FIG. 3 illustrates a perspective view of an art animal crush shown from the headbail end of the animal crush art with headbail barriers in a partly closed position.

FIGS. 1-3 illustrate perspective views of an art cattle crush and headbail with headbail barriers in a fully open position (FIG. 1); a fully closed position (FIG. 2); and in a partly closed position (FIG. 3)

The cattle crush 1 is shown from the point of view of an operator viewing the crush exit generally noted by arrow 2. The exit 2 comprises a pair of headbail barriers 3. The barriers 3 are mounted to the crush 1 sides 4 and the barriers 3 open or close the size of the opening 5 between the barriers 3. Movement of the barriers 3 between open or closed positions is driven by an actuator 6. The barriers 3 comprise an inner edge 7 extending from the top 7a of the barrier 3 to the bottom 7b of the barrier 3 and defining the opening 5. This elongated inner edge 7 is important since animals and cattle/livestock in particular perceive a longitudinal opening like this as an exit.

Intermediate top 7a and bottom 7b of each barrier 3 is a bent region 8a, 8b. The bent regions 8a, 8b align when the barriers 3 close, forming an opening 9 between the barriers 3. The bent regions 8a, 8b have a shape and form that fits about the neck region of an animal (not shown) to be restrained. In a barrier 3 open position, the animal (not shown) can move at least their head and part of their neck through the barriers 3. In a barrier 3 closed position, the opening 9 between the barriers 3 narrows typically to impose sufficient force on the animal neck passing therethrough to prevent animal movement yet not so much to cause damage to the animal.

FIG. 1 shows the headbail barriers 3 in a fully open position, FIG. 2 shows the headbail barriers in a fully closed position and FIG. 3 shows the headbail barriers 3 in a partly open position.

As may be appreciated from FIG. 1, the elongated inner edges 7 of the barriers 3 when fully open as shown in FIG. 1 define a large opening and one that is wide enough to allow almost any size animal to pass through. In practice, having an open position as shown in FIG. 1 for all scenarios is not ideal. Firstly, the amount of distance the barriers 3 have to travel to 'catch' the animal neck inherently introduces a time delay in restraining the animal. This time delay may too long and the animal may be caught too late, for example about the animal shoulders. If this happens, the animal can still move their head and can therefore not be properly restrained. The animal will need to be released and recycled into the device another time. This is inefficient and places additional stress on the animal.

A fully closed position such as that shown in FIG. 2 may also not be ideal for all animals since the barriers 3 may in this position impose a force on the animal that causes harm or pain to the animal by being too narrow.

An intermediate position such as that shown in FIG. 3 may be preferred either for an 'open' position or a 'closed' position to address the above problems. Creating a datum for this intermediate position using art apparatus is often not catered for or even possible. Manual position setting of the barriers 3 is one option to achieve an intermediate size opening but this requires some operator skill and requires the presence of a person on hand to handle the actuator.

In the art, the headbail barriers 3 may be actuated (wholly or in part) using hydraulics and associated levers manually operated by the user, the lever(s) located to one side of the device. This helps in that the operator stands well away from the animal and barriers 3. In some embodiments, actuation of barrier 3 closing and opening may still be an essentially manual operation. Given the speed with which an animal may move, considerable skill is required of the operator to correctly time barrier opening and closing.

Example 2

To solve the above issues noted around manual operation, the headbail barriers 3 may be linked to one or more sensors (not shown in FIGS. 1-3). FIGS. 4-20 described further below illustrate various sensor options.

In one embodiment a sensor may be provided that detects the degree of barrier 3 separation (e.g. by sensing the position of each barrier 3).

Before animals are to be handled, information about the individual animal size and weight or a general mob or animal's size and weight may be used to datum the sensor and provide data to calculate an optimum variable position and closed position. For example large bulls may have a wide variable position between the barriers 3 and a significant gap between the barriers still present when in the closed position commensurate with larger animal head and neck size. Smaller animals, such as calves, may have a narrowed variable position and even narrower closed position. Being able to datum these positions animal by animal or mob by mob optimises the process of animal handling.

The distance between the barriers may be sensed for example via a potentiometer and a controller may be used to input an animal size/weight. This data/information may be used by the controller to adjust the variable position and/or closed position to a pre-programmed potentiometer reading.

In further embodiments, sensors may be provided to sense one or more of: animal weight, animal height, animal size, animal neck size, and the sensed information may be used as an input to the controller.

The sensors may also be used to sense the presence of an animal and automatically cause actuation and barrier movement from an open to a closed position. The sensor for this may again be a potentiometer between the barriers 3—when an animal head passes through the barriers, the electrical impedance changes and this may actuate barrier closure, often at a reaction speed far faster than a human could manage.

Example 3

In this Example, more detail is shown around the barrier positions and interaction with potentiometer readings with reference to FIGS. 4 to 8.

Figure 4:
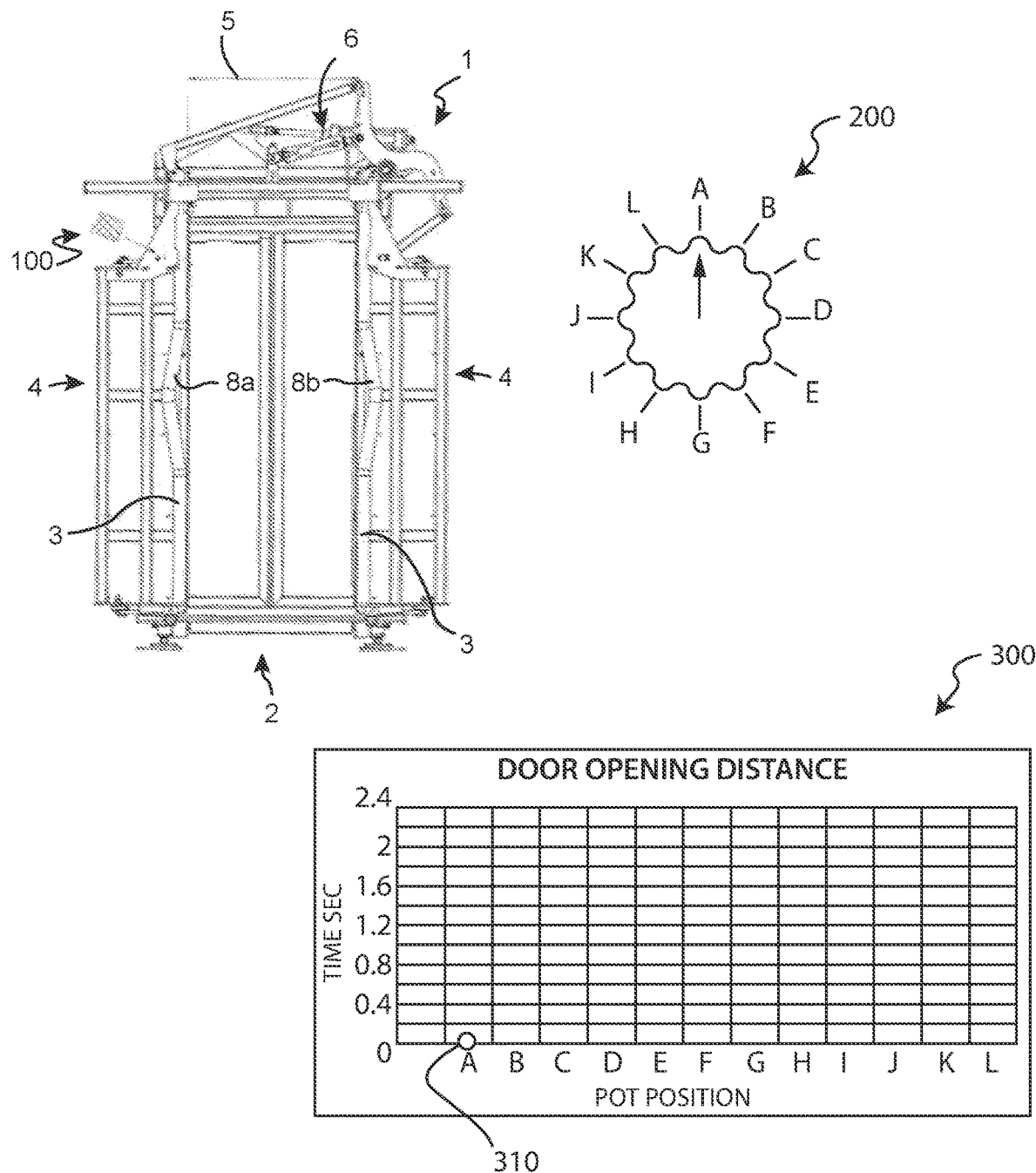
FIG. 4 illustrates an animal crush in one embodiment described herein from a headbail end view with the barriers in a fully open position also showing separately a dial position and related potentiometer reading.
Figure 5:
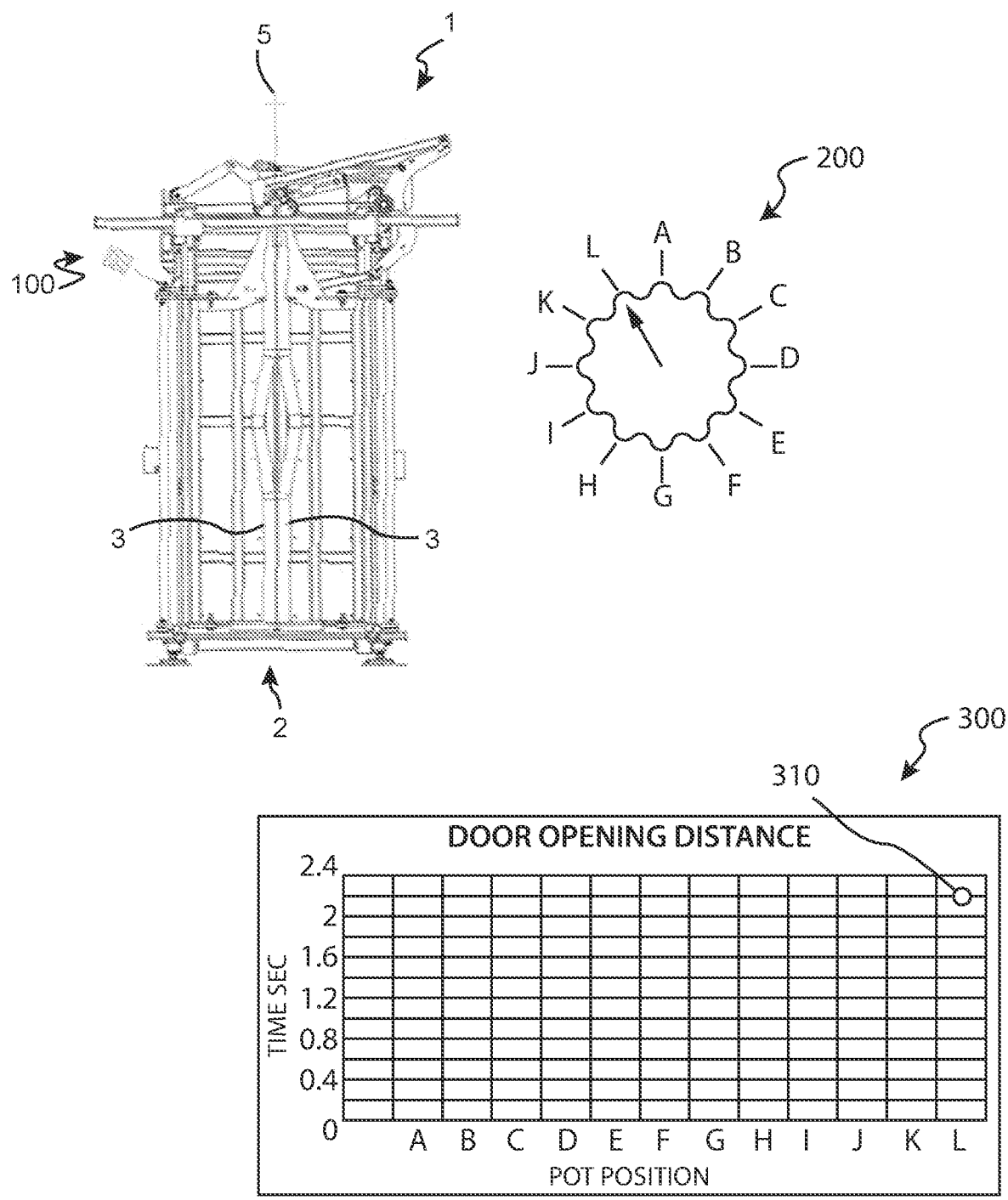
FIG. 5 illustrates an animal crush in one embodiment described herein from a headbail end view with the barriers in a fully closed position also showing separately a dial position and related potentiometer reading.
Figure 6:
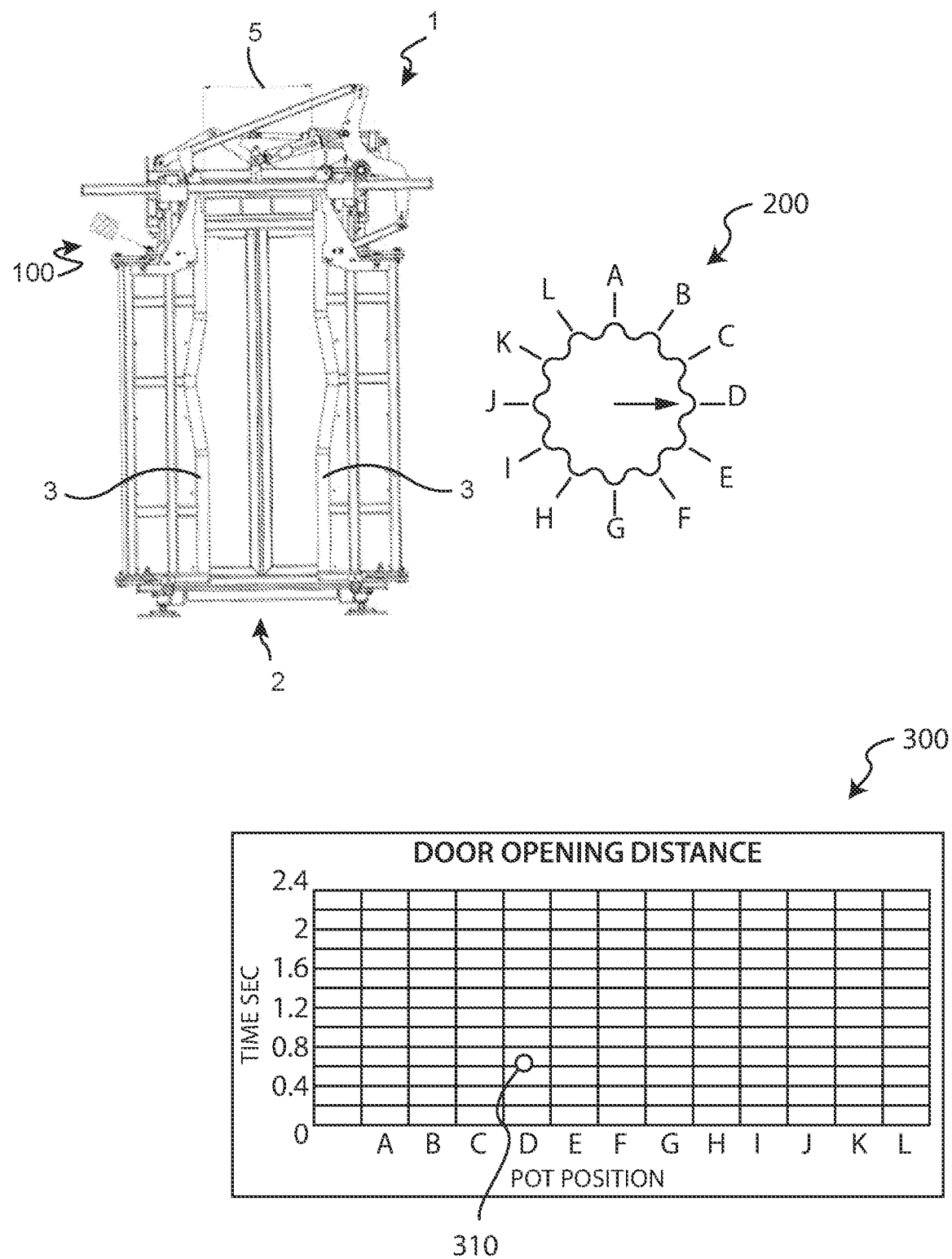
FIG. 6 illustrates an animal crush in one embodiment described herein from a headbail end view with the barriers in a first variable position also showing separately a dial position and related potentiometer reading.
Figure 7:
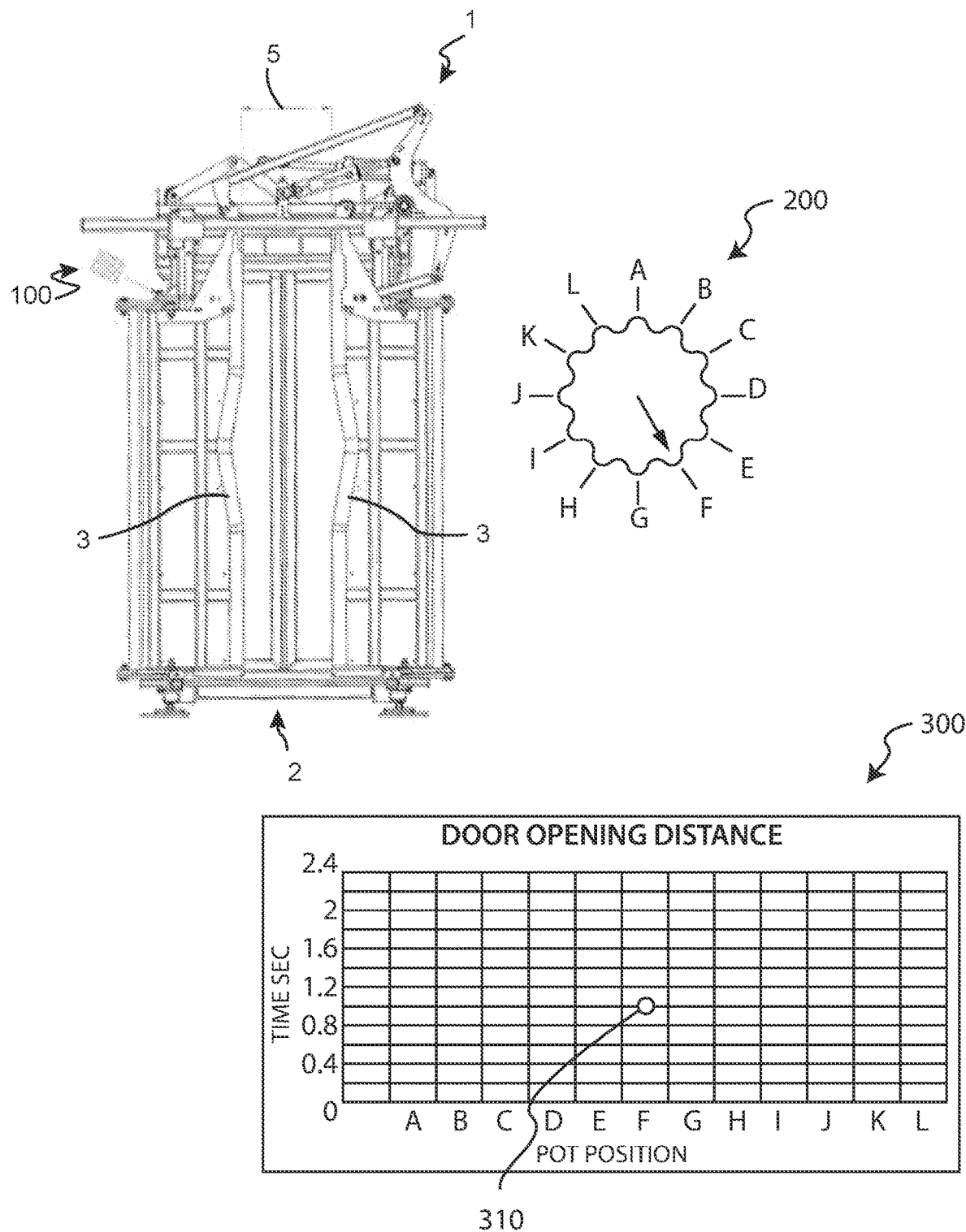
FIG. 7 illustrates an animal crush in one embodiment described herein from a headbail end view with the barriers in a second variable position also showing separately a dial position and related potentiometer reading.
Figure 8:
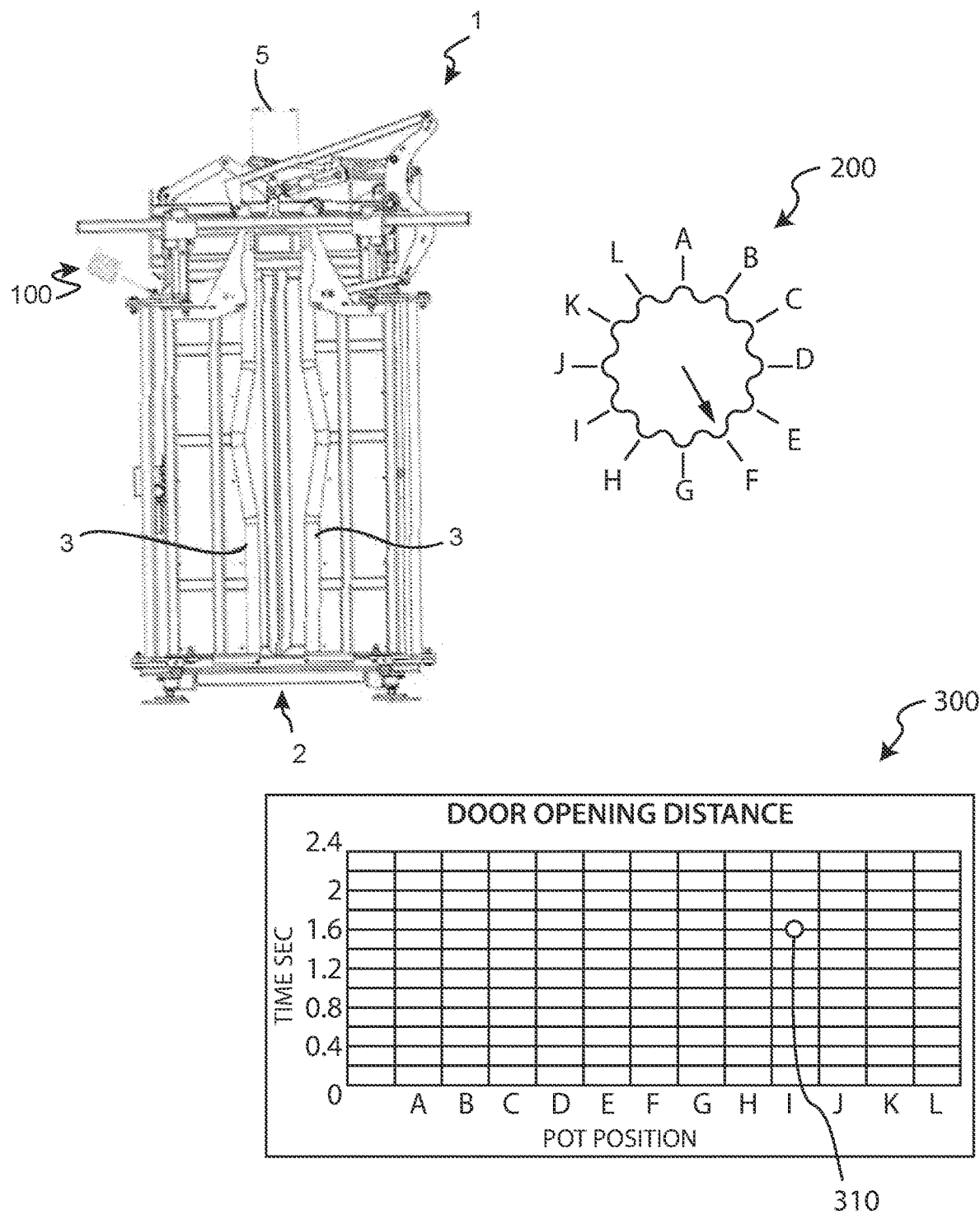
FIG. 8 illustrates an animal crush in one embodiment described herein from a headbail end view with the barriers in a third variable position also showing separately a dial position and related potentiometer reading.

FIG. 4 illustrates an animal crush 1 as viewed from a headbail end 2 of the animal crush 1 with the barriers 3 in a fully open position. Also shown on FIG. 4 separately is a dial position 200 and related potentiometer relationship 300. FIG. 5 illustrates the same animal crush 1 with the barriers 3 in a fully closed position. FIG. 6 illustrates the barriers 3 in a first variable position. FIG. 7 shows the barriers 3 in a second variable position and FIG. 8 shows the barriers 3 in a third variable position.

Alongside each end view shown is a dial 200 with positions labeled A to L to visually show a corresponding width of barrier 3 opening. Distance A shown in FIG. 4 corresponds to a fully open position i.e. maximum distance of opening between the barriers 3. Position L shown in FIG. 5 illustrates a fully closed position i.e. with the barriers 3 closed together and minimal if any separation of the barriers 3. Positions B to K represent variable positions intermediate the fully open and fully closed positions that may be used as the variable position defined herein prior to capture of an animal between the headbail barriers 3. FIGS. 5, 6 and 7 illustrate examples of variable positions associated with positions D, F and I respectively. The representation of a dial 200 to show corresponding barrier 3 position may be used in practice, for example, as a dial 200 on the crush wall or as a dial on a remote controller such as a computer, phone or tablet. The dial 200 position may be set manually or automatically via the controller (not shown) based on sensed data about an individual animal or animals. This dial 200 is however intended to be a visual prompt to illustrate barrier 3 separation for the purposes of this Example and is not necessarily a part or member used typically in manufacture of the animal crush 1 i.e. the 'dial' 200 may be a reference point in an algorithm inherent to the controller and not visually seen or used by an operator.

Also shown in FIGS. 4-8 is a graph 300 with data points 310 on each graph 300, the data points 310 corresponding to the illustrated barrier 3 separation distance A-L. The graphs 300 shown compare potentiometer position A-L in the x-axis against measured potential in time (seconds) on the y-axis. As can be seen in FIGS. 4-8, the data point 310 moves from bottom left for a maximum opening position to top right for a maximum closed position. This relationship is shown by way of example only to help visualise the way that the barrier 3 separation may be measured and how the variable position may be controlled and should not be seen as limiting.

Using the above relationship between barrier 3 position and measured potential, a controller can sense and govern barrier 3 separation distance (A-L) and set a variable position at the optimum distance based on measured animal characteristics e.g. animal age, weight, width and so on.

Also shown in FIGS. 4-8 is a sensor 100. This sensor 100 is optional but may detect the presence of the animal head emerging through the barriers 3 and, on doing so, provide a signal to the controller. The controller may then actuate barrier 3 closure to 'catch' the animal between the barriers 3. The sensor 100 in this example may be a visual sensor however other types of sensor to detect movement or presence of an animal may be used e.g. heat sensors.

Example 4

Figure 9:
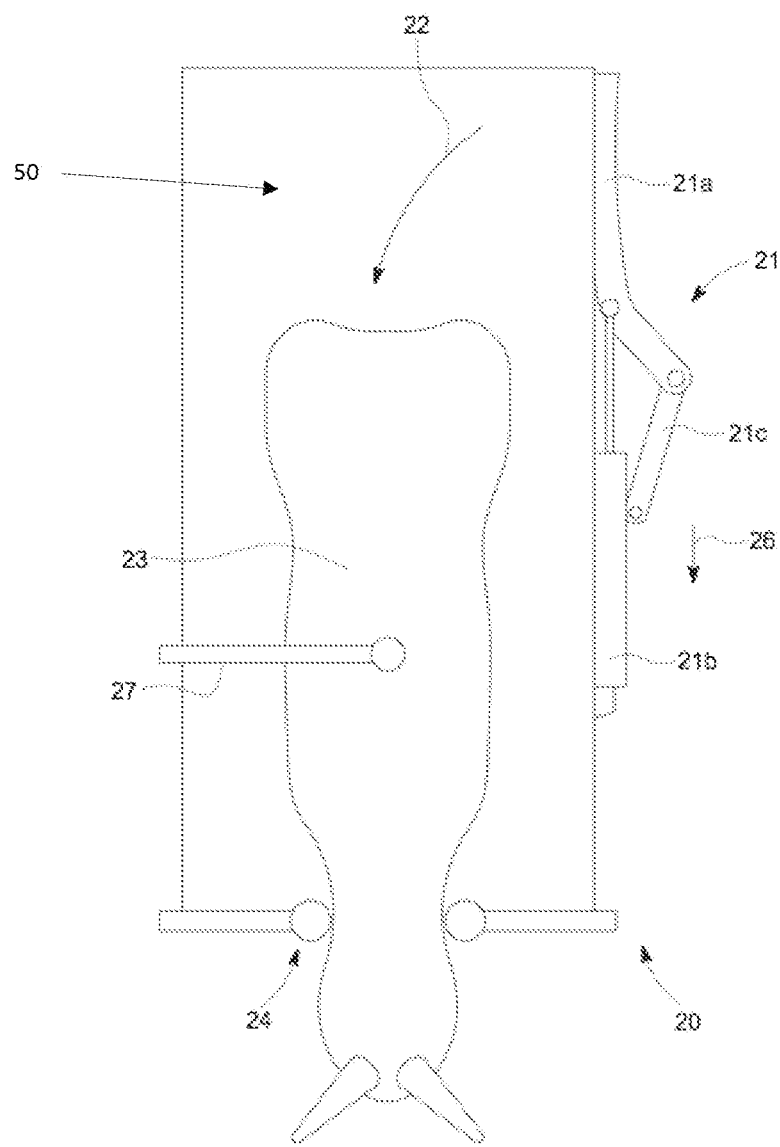
FIG. 9 illustrates a plan view of a first embodiment of an automatic back bar embodiment for the animal crush described herein.

FIG. 9 illustrates a further potential embodiment of animal crush.

It is generally regarded as important in animal crush design that the animal be securely restrained when various treatments are completed. The crush may include a crush wall or walls as an additional means for achieving restraint. Commensurate with this is the ability to position the animal correctly within the crush wall or walls which is governed by headbail capture. If the animal is too far forwards or backwards in the crush i.e. captured too early or too late by the headbail barriers 3, the animal may not be well restrained. In addition, once restrained, animals can sometimes have the strength or be sufficiently agitated to still move or even escape the crush 1 by moving rearwards.

To assist with the above problem, art devices may employ a backbar that is manually placed between the animal rear and a fixed point on the crush 1 enclosure to block rearwards movement of the animal. The backbar in the art may be simple as a pipe or beam placed across the crush 1 width to bear on the animal and which may be slid forwards to urge movement of the animal in the device 1. Manual operation of the back bar is not however ideal since it requires an operator and hence greater labour requirement.

A device generally indicated by arrow 20 incorporating an automated backbar arrangement generally indicated by arrow 21 is shown in FIG. 9. In the embodiment shown, the backbar assembly 21 may include a backbar 21*a* driven by a pair of linear actuators 21*b*, 21*c* (e.g. pneumatic, hydraulic or other linear actuators). The backbar 21 may be installed along one side of the device 20 and rotate around (arrow 22) behind the animal 23 as the animal 23 moves forwards in the device 20 to the headbail 24 restrained position illustrated in FIG. 9. The back bar may alternatively be installed to extend from the crush roof area or a point above the crush (not shown) or extended from the crush floor area 50. This movement may be driven by the linear actuators 21*b*, 21*c*. Extension of the outer linear actuator 21*c*, acting against an end of the backbar 21*a* will cause rotation 22 of the backbar 21*a* behind the animal. The two linear actuators 21*b*, 21*c* may then be retracted to move the backbar 21*a* forwards behind the animal.

The skilled reader will understand that more complex movement patterns are achievable by driving the two linear actuators in different manners. The skilled reader will also understand that various alternative arrangements may be possible to introduce a backbar behind the animal and then move it forwards. For example, the automated backbar 21 may alternatively comprise a carriage or track (not shown) that moves the backbar 21 assembly forwards (arrow 26).

The requirement for both a rotation and linear track movement may be dependent on the animal size and device size, larger animals requiring less forward movement and large devices requiring more movement of a backbar 21. Any other suitable mechanism for moving the backbar may be used.

A sensor or sensors 27 may also be used in conjunction with the automated backbar 21 as a means to activate backbar 21 rotation and/or movement forwards via the carriage riding on its track. The sensor 27 in the example shown in FIG. 9 is mounted above the device 20 and activates backbar 21 movement as the animal 23 passes the sensor 27. Any suitable sensor technology (including e.g. optical sensors, weight sensors and so on). Other sensing methods and locations may also be used.

The backbar 21 may be operated via mechanical, pneumatic or hydraulically driven systems.

By automation of the backbar 21, the animal 23 is more efficiently restrained and this process step removes the requirement for a person to manually move a backbar 21. Aside from the above advantages, automated movement may reduce any noise associated with the operation and therefore reduce risk of startling or panicking the animal. Automated movement may also speed handling of an animal 23 as they pass through the device 20.

Example 5

In this Example, an alternative second embodiment of backbar device 20 is described with reference to FIGS. 10-14.

Figure 10:
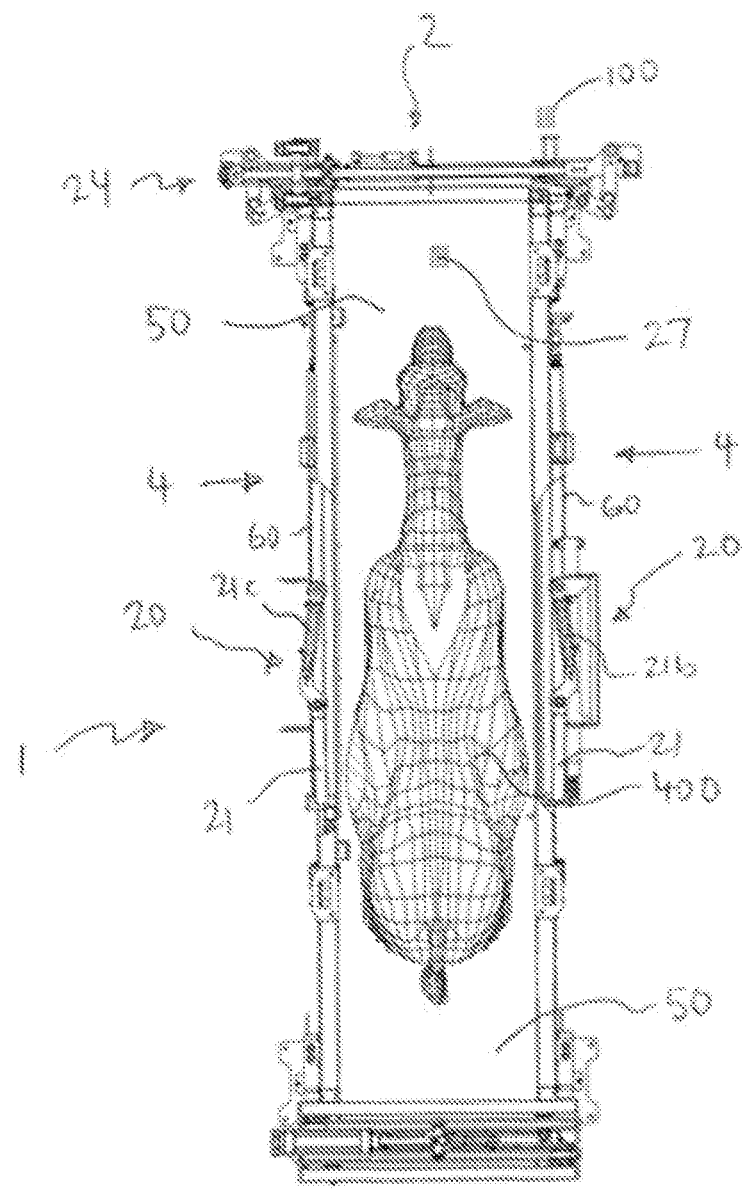
FIG. 10 illustrates a plan view of a second embodiment of an automatic back bar embodiment for the animal crush described herein with a cow shown entering the animal crush prior to backbar actuation.

FIG. 10 illustrates a plan view of the second embodiment of automatic backbar device 20 described with a cow 400 shown entering the animal crush 1 prior to backbar device 20 actuation. In this view, the cow has passed the animal crush entry and is partly through the crush 1 standing on the crush base 50. The backbars 21 in this embodiment (one on each side of the animal crush 1 mounted on the crush walls 4) are withdrawn against the crush 1 walls 4 and do not interfere with animal 400 movement through the crush 1.

Figure 11:
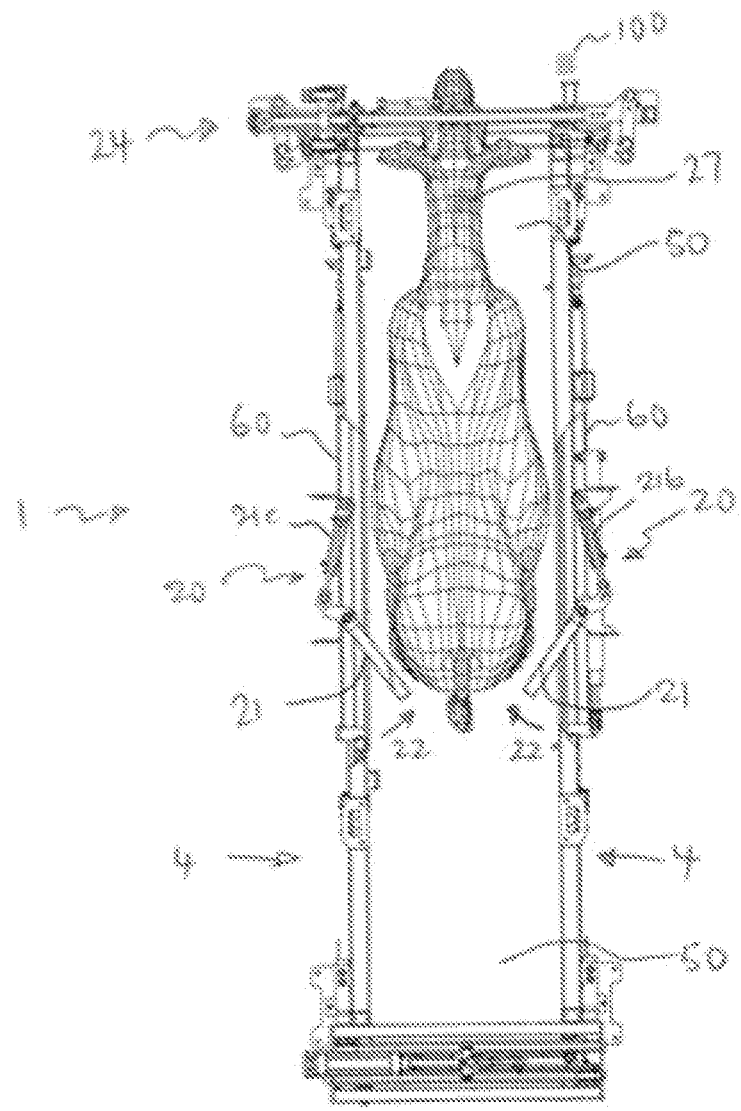
FIG. 11 illustrates a plan view of a second embodiment of an automatic back bar embodiment for the animal crush described herein with a cow shown moving forward in the animal crush backbar actuation commencing.

FIG. 11 illustrates the cow 400 moving forward in the animal crush 1 and backbar 21 actuation commencing. Actuation involves actuators 21*b*, 21*c* urging backbar 21 pivot movement from the crush 1 sides 4 to a position behind the animal 400. In FIG. 11, the backbars 21 are partly turned and not fully in position.

Figure 12:
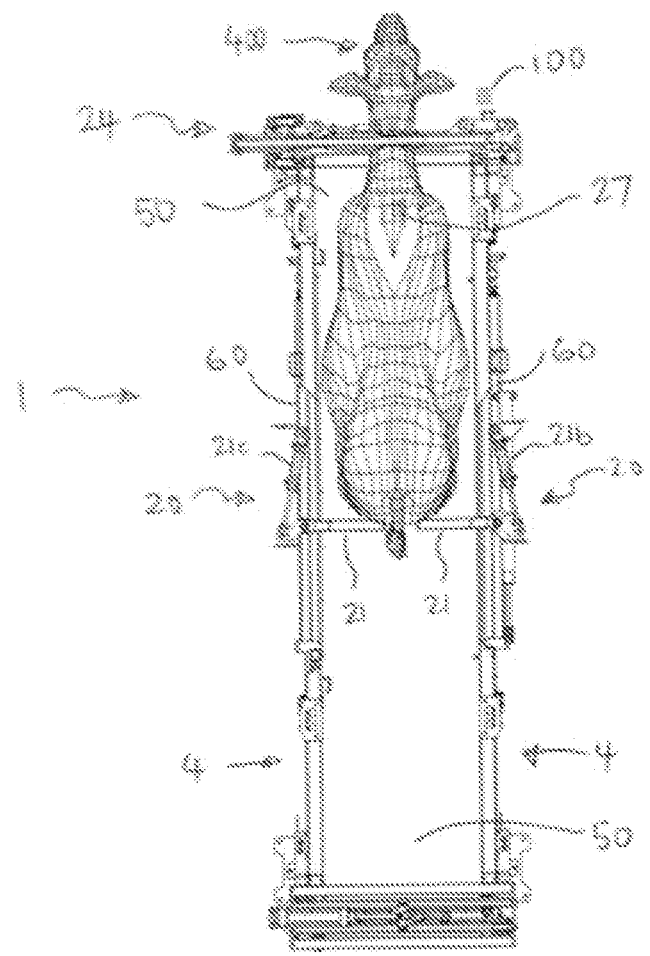
FIG. 12 illustrates a plan view of a second embodiment of an automatic back bar embodiment for the animal crush described herein with a cow shown captured between headbail barriers, the animal crush backbars preventing reverse movement by the cow.

FIG. 12 illustrates the cow 400 shown captured between headbail barriers 3, the animal crush 1 backbars 21 preventing reverse movement by the cow 400. The barbars 21 in this view are fully pivoted and almost fully cover the width of the animal crush 1.

Figure 13:
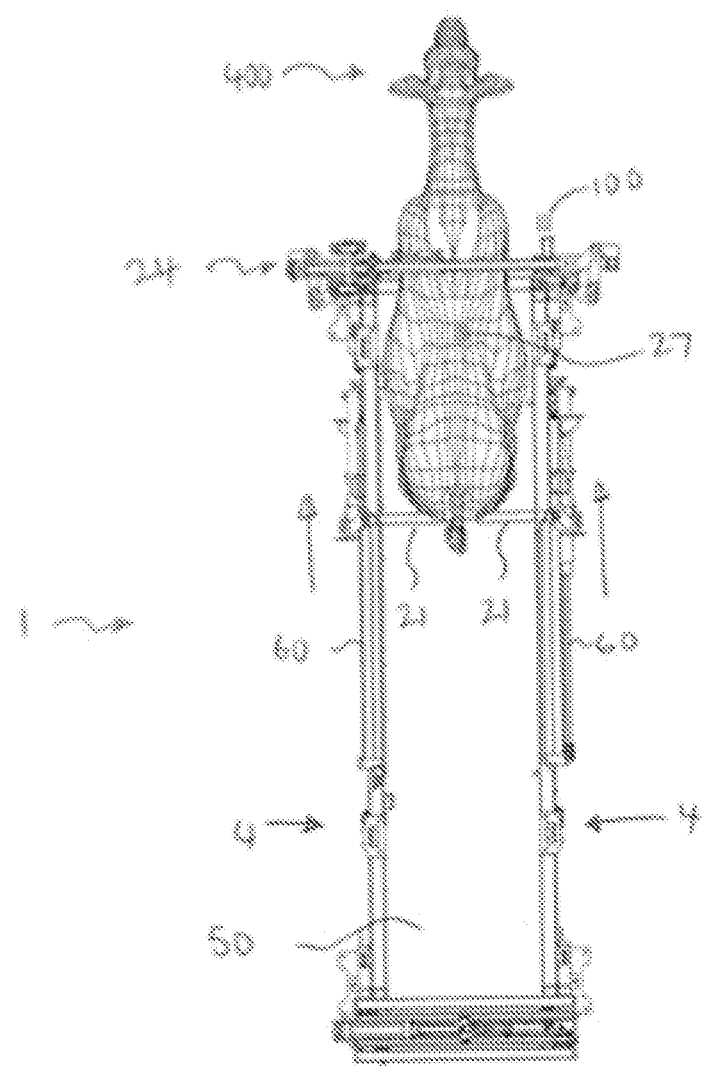
FIG. 13 illustrates a plan view of a second embodiment of an automatic back bar embodiment for the animal crush described herein with a cow shown moving forwards through the headbail barriers post opening of the barriers, the animal crush backbars urging movement by the cow through the barriers.

FIG. 13 illustrates the cow 400 moving forwards through the headbail barriers 3 post opening of the barriers 3, the animal crush 1 backbars 21 urging movement by the cow 400 through the barriers 3. Urging in this case involves longitudinal movement of the backbars 21 forwards towards the headbail end 2 of the animal crush 1. Longitudinal movement may be along rails 60 located on either side of the animal crush 1 driven by a ram or other actuator. During longitudinal movement, the backbars 21 remain in an animal crush 1 closed (non-retracted) position behind the animal 400. This causes the backbars 21 to bear on the animal 400 and push the animal 400 forwards.

Figure 14:
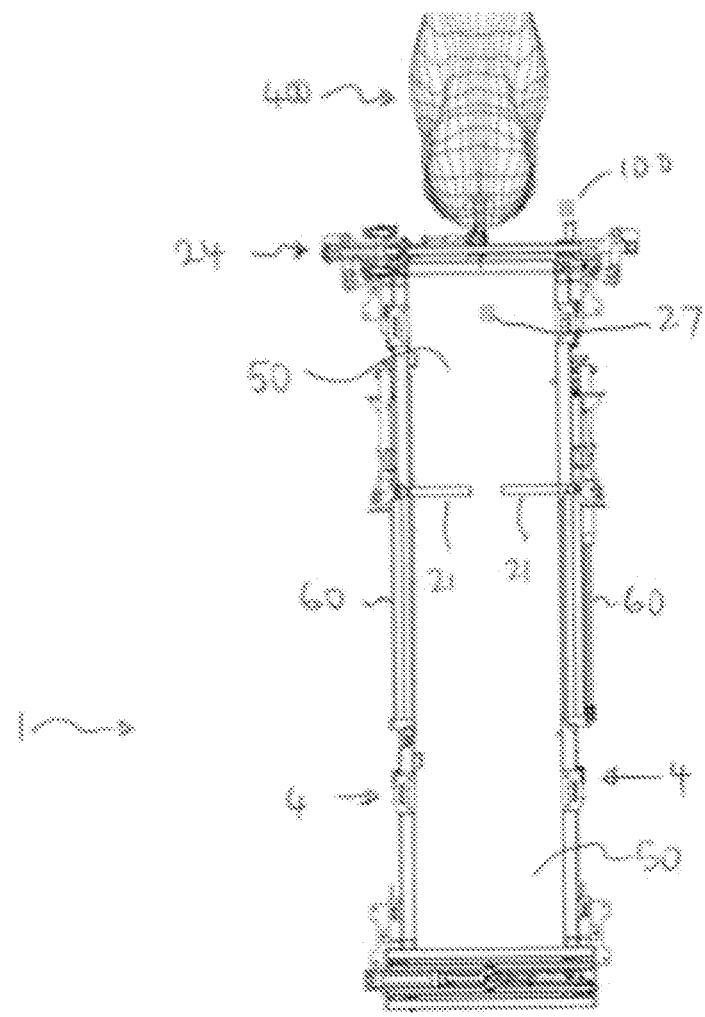
FIG. 14 illustrates a plan view of a second embodiment of an automatic back bar embodiment for the animal crush described herein with a cow shown exiting the animal crush, the animal crush backbars in a maximum forwards position.

FIG. 14 illustrates the cow 400 shown exiting the animal crush 1, the animal crush 1 backbars 21 in a maximum forwards position longitudinally. At this point, the backbars may be returned to a start position shown in FIG. 10 through reversal of the above movements.

Backbar 21 movement noted above may be actuated via one or more sensors. The sensors may be positional sensors based on position on the crush base described further below in Example 6 or may be via other sensors. FIGS. 10-14 shown schematically an overhead sensor 27 that senses animal movement and which may be used to actuate back bar movement. The overhead sensor 27 may be a visual sensor although other types of sensor may also be used.

Example 6

In this Example, an embodiment of positional sensing is described using load cells 210 with reference to FIGS. 15-20. Positional sensing refers to use of sensors, in this example being load cells 210 to determine whether an animal 400 is on the crush base 50 and if so, where the animal 400 is located on the crush base 50. In addition, positional sensing may be used to detect the presence of more than one animal 400 on the crush base 50 and where the additional animal 400 is located. Load cells 210 in or about a crush base 50 are routinely used for measurement of animal 400 weight, weight measurement being a routine test. Differences may exist in the load measured by an individual load cell 210 and when those differences are measured alongside other load cells 210 and in conjunction with load cell location, a controller can calculate animal 400 position on the crush base 50. Knowing animal 400 position may be used to actuate various crush 1 operations such as: backbar 21 movement; headbail barrier 3 capture and opening; crush 1 entry gate opening and closing; operations undertaken automatically when an animal has been captured by the headbail such as automated medicament application and so on.

Figure 15:
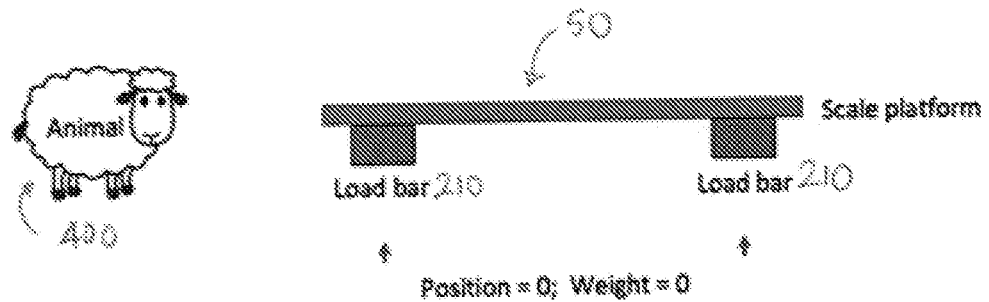
FIG. 15 illustrates a schematic side view of an animal positional sensor system with no animal on the crush base.

FIG. 15 illustrates a schematic side view of an animal 400 positional sensor system with no animal 400 on the crush base 50. In this scenario, the crush base 50 or scale is effectively zeroed. Note that two load cells 210 are shown however more load cells 210 may be used particularly where location sensitive points are reached on the crush base 50. In this scenario, the position is given a score of 0 and the animal 400 weight is 0 kg since no load is on the crush base 50.

Figure 16:
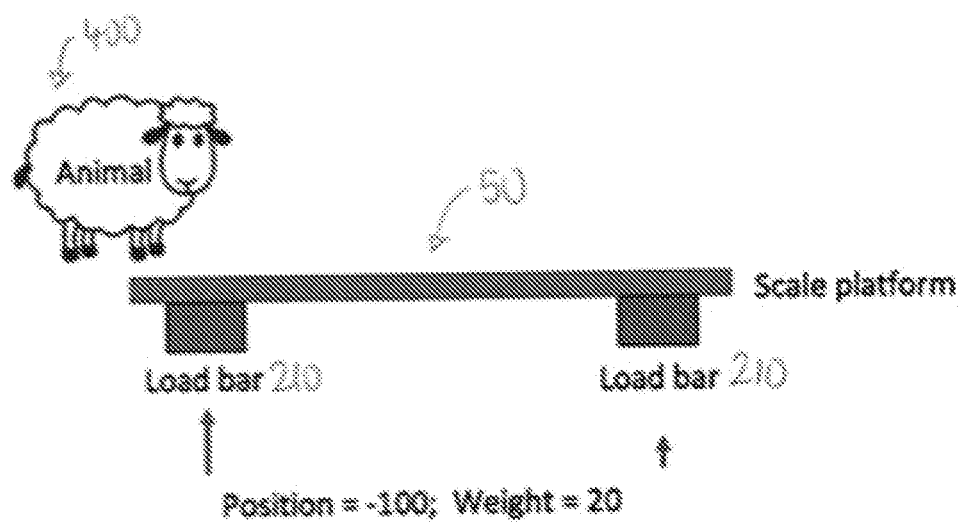
FIG. 16 illustrates a schematic side view of an animal positional sensor system with an animal mounting the crush base.

FIG. 16 illustrates a schematic side view of an animal 400 positional sensor system with an animal 400 mounting the crush base 50. In this scenario, the animal 400 has two front legs on the crush base 50, the rear legs not yet on the crush base 50. This position introduces a significant load on the first load cell 210 and a lower load on the more distant load cell 210. In this example, the position may be given a score of −100 and the weight a mid-weight of 20 (being half the weight of an average sheep 400).

Figure 17:
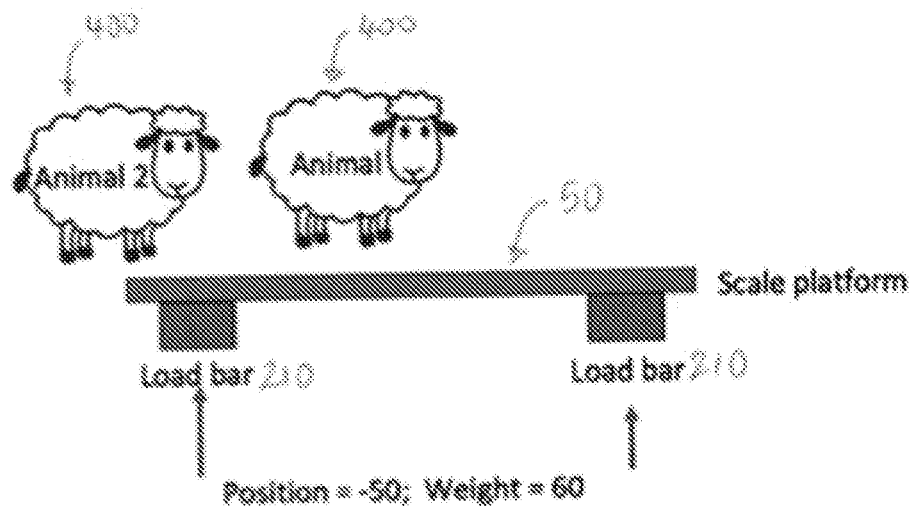
FIG. 17 illustrates a schematic side view of an animal positional sensor system with an animal on the crush base and a second animal 'tail gating' the first animal.

FIG. 17 illustrates a schematic side view of an animal 400 positional sensor system with an animal 400 on the crush base 50 and a second animal 400 'tail gating' the first animal 400. In this scenario, a tail gating second animal 400 is partly stepping onto the crush base 50. The score allocated may be a position of −50 and a weight of 60 kg. In this circumstance, the weight would be higher than expected (1.5 sheep) and the offset in position would indicate to a controller the presence of a second animal 400 and the tail gating position of that animal 400. Measures could be taken in this scenario such as automatic actuation of a gate or obstruction to block the second animal 400 and/or an alarm issue to call for an operator to separate the tail gating sheep 400.

Figure 18:
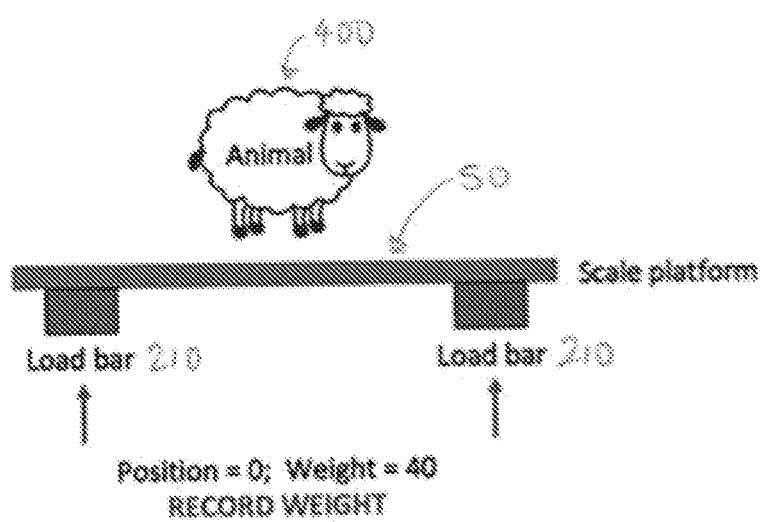
FIG. 18 illustrates a schematic side view of an animal positional sensor system with an animal centred on the crush base.

FIG. 18 illustrates a schematic side view of an animal 400 positional sensor system with an animal 400 centred on the crush base 50. In this scenario, with the animal 400 centred, the load on the respective load cells 210 may be balanced hence given a score of 0 and a weight measured being the true weight of the animal 400, in the Figure shown as 40 kg. This balanced position may be a moment at which the animal 400 weight may be measured. Note that this balanced point need not be centrally located on the crush base 50. In this Figure, only two opposing load cells 210 are shown hence a mid-point between the two load cells 210 would be a suitable balanced location for weight measurement. Were more load cells 210 used at other locations on the crush base 50, other positions of the animal 400 along the crush base 50 may be balanced points that may be used for measurement of true animal 400 weight.

Figure 19:
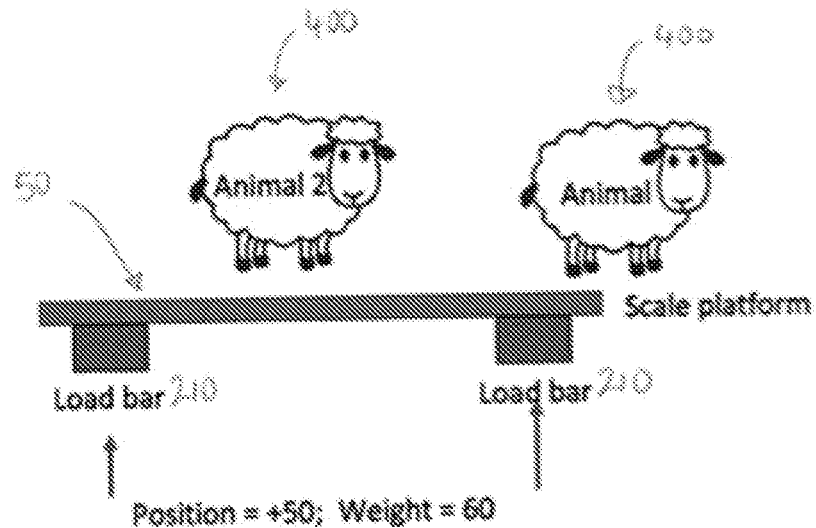
FIG. 19 illustrates a schematic side view of an animal positional sensor system with an animal exiting the crush base and a next animal on the crush base.

FIG. 19 illustrates a schematic side view of an animal 400 positional sensor system with an animal 400 exiting the crush base 50 and a next animal 400 on the crush base 50. In this scenario, the position score may be −50 and the weight 60 kg being 1.5 animals 400. From these measurements, the controller could determine the presence of more than one animal 400 on the crush base 50 and could determine the positions of the animals 400 based on the varied/uneven load measurement on the load cells 210.

Figure 20:
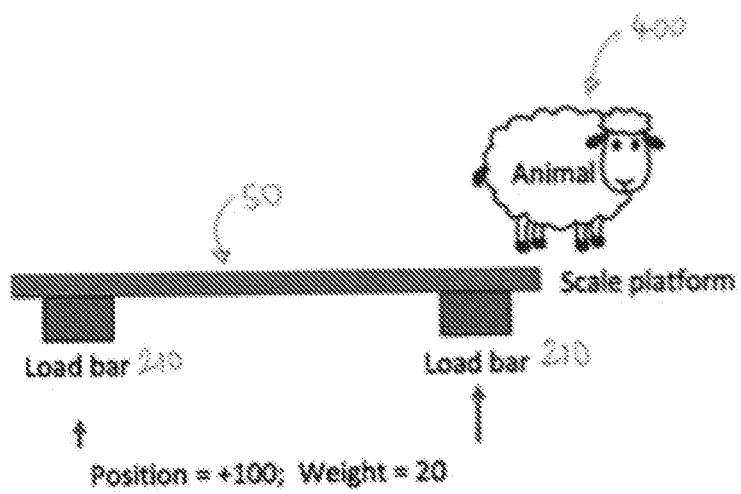
FIG. 20 illustrates a schematic side view of an animal positional sensor system with an animal exiting the crush base.

FIG. 20 illustrates a schematic side view of an animal 400 positional sensor system with an animal 400 exiting the crush base 50. In this case, the position may be −100 and weight 20 kg but with the load predominantly on the exit end load cell 210.

Example 7

In this example, a typical method of use of the crush 1 is described.

In use, animals 400 such as cattle may be herded into a holding pen and along a race, where automatically controlled barriers prevent the animals 400 from moving backwards. The race may lead the animals 400 into a crush with an automatic entry door. The animal 400 enters the crush 1 through the entry barrier and may be urged forwards via a backbar device 20 such as the automated backbar described in Example 4 or Example 5 above.

In one embodiment, as the animal 400 attempts to exit the crush 1 the animal 400 position is sensed and the barriers 3 catch the animal 400 thereby halting motion of the animal 400.

Optionally, the animal crush 1 further restrains animal 400 movement in the crush 1 by use of a wall or other member or members that move to bear against the side of the animal (not shown). Bearing on the animal side(s) may occur before capture of the animal head and neck in the headbail barriers 3 or after capture in the headbail barriers 3.

The headbail may also comprise an automatic head position adjustor to alter the head opening position between the barriers 3. Adjustment may be up or down (not shown) to move the yoke position of the barriers 3 and address animal height differences.

Once restrained, various measurements and treatment steps may be taken. For example, the crush 1 may incorporate a weigh scale and EID reader panel to measure animal 400 identity and weight, an automatic pour on gun mounted on a rail above the animal may then dispense a weight based dose down the length of the animal's 400 back, additional electronic injector guns may be used for other medicaments, the guns in communication with a smart device and the dose size, medicament and weight recorded against the animal EID. Post treatment, the animal 400 may then be manually or automatically released from the crush. Animals 400 may be released or may be directed into an automatic drafting device where the animals are drafted as required into holding pens.

Aspects of the animal handling device have been described by way of example only and it should be appreciated that modifications and additions may be made thereto without departing from the scope of the claims herein.

What is claimed is:

1. An animal crush system comprising:
   a headbail at an exit end of the animal crush system configured to interact with a neck of an animal passing through the animal crush system, the headbail comprising:
      opposing barriers, the opposing barriers being moveable between a fully open position, a fully closed position, and a variable position, the variable position comprising the opposing barriers in a position located intermediate the fully open position and the fully closed position;
      an actuator configured to adjust a distance between the opposing barriers;
      a potentiometer configured to sense the distance between the opposing barriers by measuring electrical impedance; and
      a controller comprising a dial that is communicatively coupled with the actuator, the dial configured to be adjusted in position to a datum position, each position of the dial corresponding to an impedance measurement of the potentiometer equivalent to the fully open position, the fully closed position, and the variable position;
      the datum position based on an animal characteristic selected from: animal shape, animal size, animal age, animal species, animal sex, animal body condition score (BCS), animal ID tag, or any combination thereof;
      wherein the potentiometer further measures a change in impedance once the datum position is set caused by presence of an animal and uses the change in impedance to automatically cause the actuator to move the opposing barriers to the fully closed position.

2. The animal crush system of claim 1, wherein in the fully open position, the opposing barriers do not block movement of an animal through the opposing barriers.

3. The animal crush system of claim 1, wherein in the fully closed positioned, the opposing barriers impose sufficient force on an animal's neck positioned between the opposing barriers to capture the animal and prevent movement of the animal forwards or backwards.

4. The animal crush system as claimed in claim 1, further comprising:
   one or more animal position sensors; and
   at least one backbar;
   wherein the controller is further configured to:
      automatically move the at least one backbar from a retracted position to an animal urging position when the one or more animal position sensors sense a presence of an animal at a predetermined distance in the animal crush system.

5. The animal crush system as claimed in claim 1, further comprising:
   multiple load cells located in varying positions about a base of the animal crush system;
   wherein the controller is further configured to:
      receive weight measurements from the multiple load cells and a location of the multiple load cells sending a weight measurement;
      from the weight measurements and load cell locations, calculate an animal position within the animal crush system; and
      instruct the actuator to move the opposing barriers to the fully closed position when the animal position is calculated as being proximate the opposing barriers.

6. The animal crush system as claimed in claim 1, wherein, before animals are to be handled, an individual animal characteristic is used to set a datum position of the opposing barriers.

7. The animal crush system as claimed in claim 1, wherein, before animals are to be handled, the animal characteristic of a general mob of animals is used to set a datum position of the opposing barriers.

8. The animal crush system as claimed in claim 1, wherein the dial is located on the animal crush system.

9. The animal crush system as claimed in claim 1, wherein the dial is located on a remote controller.

10. The animal crush system as claimed in claim 1, wherein a position of the dial is set manually.

11. The animal crush system as claimed in claim 1, wherein a position of the dial is set automatically based on the animal characteristic.

12. The animal crush system as claimed in claim 1, wherein the dial provides a visual prompt to illustrate the position of the opposing barriers.

\* \* \* \* \*